US010536487B2

(12) United States Patent
Gonzalez De Langarica et al.

(10) Patent No.: US 10,536,487 B2
(45) Date of Patent: Jan. 14, 2020

(54) END USER CONTROLLED MULTI-SERVICE DEVICE PRIORITY SETTING

(71) Applicant: Telefonaktiebolaget LM Ericsson (publ), Stockholm (SE)

(72) Inventors: Ester Gonzalez De Langarica, Stockholm (SE); Afshin Abtin, Sollentuna (SE); Mattias Dahlqvist, Stockholm (SE); Cormac Hegarty, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 316 days.

(21) Appl. No.: 15/111,128

(22) PCT Filed: Jan. 22, 2014

(86) PCT No.: PCT/SE2014/050073
§ 371 (c)(1),
(2) Date: Jul. 12, 2016

(87) PCT Pub. No.: WO2015/112060
PCT Pub. Date: Jul. 30, 2015

(65) Prior Publication Data
US 2016/0344776 A1 Nov. 24, 2016

(51) Int. Cl.
*H04L 29/06* (2006.01)
*H04L 29/08* (2006.01)
(52) U.S. Cl.
CPC ...... *H04L 65/1016* (2013.01); *H04L 65/1006* (2013.01); *H04L 65/1063* (2013.01); *H04L 65/1073* (2013.01); *H04L 67/24* (2013.01)
(58) Field of Classification Search
CPC ............. H04L 65/1006; H04L 65/1016; H04L 65/1063; H04L 65/1073; H04L 67/24; H04L 67/30
See application file for complete search history.

(56) References Cited

U.S. PATENT DOCUMENTS 9,372,963 B2 * 6/2016 Lau .................. G06F 21/00
2002/0016811 A1 * 2/2002 Gall .................. G06F 9/5072
718/102

(Continued)

FOREIGN PATENT DOCUMENTS

EP 2 282 477 A1 2/2011

OTHER PUBLICATIONS

International Search Report and Written Opinion of the International Searching Authority, Application No. PCT/SE2014/050073, dated Aug. 28, 2014.
3GPP, Technical Specification—"3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 12)", 3GPP TS 26.237 V12.1.0 (Dec. 2013), 157 pp.

(Continued)

*Primary Examiner* — Christopher Biagini
(74) *Attorney, Agent, or Firm* — Sage Patent Group

(57) ABSTRACT

A communication network allows an end user to dynamically select a user device among user devices associated with the user's subscription as the primary user device by defining a primary capability tag or attribute. Selection of a user device sets the primary capability tag of the selected user device, which is published towards an application server. The application server notifies all other user devices in the group of devices. If a previous user device in the group of user devices was set as the primary user device, then, in response to the notification, the previous user device performs a re-registration with the network removing the previous user device as the primary user device for the services associated with the user subscription. The selected user device also performs a re-registration/registration with the network so all incoming requests for services associated with the user subscription are sent to the selected user device.

21 Claims, 14 Drawing Sheets

(56) References Cited

U.S. PATENT DOCUMENTS

| | | | |
|---|---|---|---|
| 2005/0037706 A1* | 2/2005 | Settle | H04B 7/18586 455/12.1 |
| 2005/0138128 A1* | 6/2005 | Baniel | H04L 29/06 709/206 |
| 2008/0260136 A1* | 10/2008 | Rahman | H04M 3/54 379/211.02 |
| 2009/0138564 A1* | 5/2009 | Beddus | H04L 69/329 709/206 |
| 2011/0026704 A1* | 2/2011 | Connelly | H04L 63/102 379/219 |
| 2011/0194554 A1* | 8/2011 | Gavita | H04L 65/1016 370/352 |
| 2014/0025758 A1* | 1/2014 | Glowacki | H04L 12/1895 709/206 |
| 2014/0258368 A1* | 9/2014 | Suryavanshi | H04L 29/06047 709/203 |

OTHER PUBLICATIONS

GSMA Association, "Rich Communication Suite 5.1 Advanced Communications Services and Client Specification" (RCS 5.1), Version 1.0, Aug. 13, 2012, 26 pp.

Olsson et al., "Communication Services—The key to IMS service growth", *Ericsson Review*, No. 1, Jan. 1, 2008, pp. 8-13.

Poikselkä et al., "IMS concepts", Chapter 3 in *The IMS: IP Multimedia Concepts and Services, Second Edition*, John Wiley & Sons, Jul. 14, 2006 pp. 43-116.

Rosenberg et al., "Caller Preference for the Session Initiation Protocol (SIP)", Network Working Group, Request for Comments: 3841, Category: Standards Track, Aug. 2004, 26 pp.

\* cited by examiner

US 10,536,487 B2

END USER CONTROLLED MULTI-SERVICE DEVICE PRIORITY SETTING

CROSS REFERENCE TO RELATED APPLICATION

This application is a 35 U.S.C. § 371 national stage application of PCT International Application No. PCT/SE2014/050073, filed on Jan. 22, 2014, the disclosure and content of which is incorporated by reference herein in its entirety. The above-referenced PCT International Application was published in the English language as International Publication No. WO 2015/112060 A1 on Jul. 30, 2015.

TECHNICAL FIELD

The present invention relates to methods and apparatus for routing service requests to user devices by designating a user device to be the primary user device for receiving service requests for a group of user devices associated with a user subscription.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1, a control of communications occurs at three layers (or planes). The lowest layer is the Connectivity Layer 1, also referred to as the bearer plane and through which signals are directed to/from user devices accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality.

The user device or user equipment (UE) may comprise or represent any device or equipment used for communications over a communications network. Examples of a user device or UE that may be used in certain embodiments of the described network(s) are wireless devices such as mobile phones, terminals, smart phones, portable computing devices such as lap tops, handheld devices, tablets, netbooks, computers, personal digital assistants and other wireless devices that may connect to a communications network, or wired or fixed communication devices such as telephones, computing devices such as desktop computers, set-top boxes, televisions, or other devices that may connect to a communications network.

Communication networks may comprise or represent any network used for communications with user devices or UEs connected to the communications network. Examples of communications networks include, but are not limited to, wireless networks such as the Worldwide Interoperability for Microwave Access (WiMAX), wireless local area networks (WLAN) based on the Institute of Electrical and Electronics Engineers' (IEEE) 802.11 standards e.g. Wi-Fi networks, or Internet Protocol (IP) networks, packet-switched networks or enhanced packet switched networks, IMS networks, or communications networks based on wireless, cellular or satellite technologies such as mobile networks, Global System for Mobile Communications (GSM), Wideband Code Division Multiple Access (W-CDMA), CDMA2000 or Long Term Evolution (LTE)/LTE Advanced mobile networks or any $2^{nd}$, $3^{rd}$ or $4^{th}$ Generation and beyond communications networks.

Nowadays the Rich Communication Suite 5.1 standard defines two mechanisms to exchange user device capabilities including both basic communication services and applications. IMS basic communication services (IMS CoSe) are identified by an IMS communication service identifier (ICSI), and applications or services are identified by an IMS application reference identifier (IARI). Two mechanisms may be used as a capabilities exchange mechanism, the OPTIONS mechanism or the Presence mechanism as outlined in section 6.2 of the RCS 5.1 standard.

Typically user devices publish their capabilities towards a capabilities exchange application server (e.g. CX-AS) in the communication network, which acts as a store of the capabilities for each user device. User devices may then subscribe with the CX-AS to receive the capabilities of other user devices in the network, which allows user devices to receive the capabilities of other user devices in the network for use when the user devices wish to communicate with each other using various application and services. The capabilities and capability notifications may be based on the Extensible Mark-up Language (XML), in which capabilities are defined using elements and attributes that are indicated in an XML document using tags etc. Further information on the capabilities exchange mechanisms for IMS, MMTel, RCS, and capability exchange may be found in RFC 3841, "Caller Preferences for the Session Initiation Protocol (SIP)", http://tools.ietf.org/html/rfc3841, or RCS 5.1 Services and Client Specification, version 2.0, which are herein incorporated by reference.

IMS (e.g. RCS, Voice over LTE) supports multi-devices per user and multi-service subscriptions. Users can a multitude of multimedia enabled user devices (e.g. work smart-phone(s), home smart phone(s), TVs, laptops etc.) attached to their user subscription. Depending on user behaviour (e.g. a user is registered/attached with a number of their user devices simultaneously), IMS controlled services may fork to all user devices and the user will receive service request(s), incoming requests, or calls, etc. on all registered user devices. Currently in an IMS multi-service deployment (e.g. MMTel, RCS with presence etc.) typically all user devices associated with a subscription and registered in the network will receive incoming service requests from the various services available, which can be an amalgamation/mixture of communication services such as, by way of example only, MMTel, video, Presence, Chat services etc.

Mechanisms exist in MMTel via Ut to change the calling preference per device (e.g. "Flexible Communication Distribution in MMTel Application Server (MTAS)", 1/155 17-CNA 403 9026 Uen). However these calling preference settings are only relevant for specific services on MTAS (e.g. Ut terminated in XDMS in MMTel AS). They are not relevant for other services hosted on other application servers or applications. For a user with multiple devices associated with the user's subscription such as a multi-service subscription, this can lead to a cumbersome user experience as described and illustrated with reference to FIG. 2.

FIG. 2 is a schematic illustration of a communication network 200 including an MMTel/IMS Core 201 for providing network access to several user devices, i.e. a first, second and third user device 202a, 202b and 202c (e.g. mobile phone, laptop, TV) associated with user 203. The communications network 200 also includes a remote end or originating side 204 of the network from which other users (not shown) may originate calls or service requests associated with user 203 and one of the user devices 202a-202c. In this example, user 203 has several user devices 202a, 202b and 202c registered at home and has several services available (e.g. MMTel voice & video, presence etc.) The FCD service in the MMTel AS of the MMTeL/IMS Core 201 allows the caller preference per user device 202a-202c to be changed, which allows the user 203 to allocate a preferred user device that will "ring" first.

For example, the user 203 may wish to allocate the second user device 202b (e.g. their laptop) as the "primary device" on which all incoming service requests or calls are to be received. This is because the user 203 is at home and the family may be watching or using the third user device 202c (e.g. TV) and it would not be optimal that the third user device 202c receives all incoming service requests. By using Ut and the FCD service in the MMTel AS the caller preference per device 202a-202c can be configured to ring the second user device 202b (e.g. laptop) first and then the remaining user devices 202a and 202c if the second user device 202b does not answer. As a specific setting request was sent to a specific service in an AS the user 203 will now receive all MMTel related services (e.g. MMTel voice & video) on the second user device 202b (e.g. laptop) first. However all other services will still be forked to all other registered user devices 202a and 202c (e.g. the mobile telephone and the TV). For example, all presence related requests may be shown on the third user device 202c (e.g. TV). FCD allows only some services to send service requests to the primary user device, and is only useful for MMTel AS services. There will still be unavoidable interruptions to the user and other users on the first and third user devices 202a and 202c for the majority of other services that are available.

Basically, FCD is an IMS terminating service allows multiple user devices (or targets) to be alerted ("rings") either serially or in a parallel fashion based on user configuration rules. The FCD service can ring up to 1 to 10 targets. User configuration rules can specify either a serial or a parallel distribution. The serial distribution calls each of the targets identified in the active rule consecutively until one target answers or all targets have been unsuccessfully attempted. Each communication set-up attempt is limited in duration by an answer timer. Following expiry of the timer the communication set-up attempt is cancelled and the next target identity in the active rule, if any, is attempted. Parallel distribution calls all targets in the active rule at the same time until one target answers or the time allowed for an answer expires. Following answer or timer expiry communication set-up attempts to unanswered targets from which a final response has not been received are cancelled.

It is evident that FCD can result in a large waste of communications resources should the user not answer immediately the first user device. In addition, in a multiple user device scenario, if a user is using another user device in the group of devices (e.g. a TV or computer), then serial and parallel distribution will cause unnecessary interruptions as described with reference to FIG. 2, this leads to a cumbersome user experience.

There are limited mechanisms in current networks such as those based on IMS that allow the user to have some semblance of control over caller preferences to multiple user devices (e.g. for FCD, the group of user devices may be configured to ring in parallel or ring serially). FCD only allows for a limited user control (via the standard Ut interface) for which user device should initially receive MMTel sessions/service requests etc. The FCD configuration options are only supported and relevant to specific services on a specific application server (e.g. the MMTel AS) in the communication network, which needs to store end user configuration options. It is not a network wide setting (i.e. it will not encompass other services). The services and corresponding service requests or calls that are not subject to the FCD user configuration options or changes thereto will all be received on all user devices, even non-primary user devices that are registered in the communication network. There is no simple and convenient solution for users to control which user device should only receive incoming service requests from multiple services, which can be an amalgamation/mixture of communication services such as, by way of example only, MMTel, Presence, Chat services etc.

Although similar or enhance mechanisms (e.g. subscriber self-management interfaces) could be implemented on all relevant application servers providing the end user services (e.g. Presence server, chat server etc.), such a solution will require expensive and complicated multi-server network assisted synchronization. There is a desire to reduce the wastage of communications resources such as signaling waste, reduce the complexity of communications systems and networks, and improve user control and the user experience for users with multi-device and multi-service subscriptions. There is also a desire to allow users to dynamically control the user device(s) in a group of user devices associated with a user subscription that answer incoming requests (e.g. session/service/call request).

SUMMARY

It is an object of the present invention to provide methods and apparatus to provide a mechanism to ensure the end user can dynamically set a primary user device from a group of devices associated with the user for all the services or all relevant services the user has subscribed to. This will provide the advantage that the diverse range of service requests are sent to a primary user device without the need to update all the application servers in the communication network providing the services. Further advantages include minimising waste of communications resources, reducing complexity of communications systems, minimising unnecessary interruptions from incoming service requests on the remaining user devices associated with the user, improved productivity on the group of user devices and a significant improvement in a user's experience of the communication network.

According to a first aspect of the invention there is provided a method of routing or redirecting service requests to user devices in a communications network including an IP multimedia subsystem (IMS), an application server (AS) with the functionality of a capability exchange AS, and a group of user devices are associated with an IMS user subscription. The method includes setting a user device to be a primary user device of the group of user devices for receiving all incoming service requests from services associated with the group of user devices. Sending a primary capability indication associated with the user device to the AS for use in notifying the primary capability indication associated with the user device to other user devices in the group of user devices. The primary capability indication includes data representative of the user device being the primary user device for the group of devices.

As an option, the method further includes registering with the IMS that the user device that is set as the primary user device and is the primary user device for the services associated with the group of user devices. As another option, the method may include setting the user device to be a primary user device by selecting which user device from the group of user devices is to be the primary user device.

Optionally, the method includes receiving a capabilities notification from the AS, the capabilities notification including a primary capability indication associated with another user device of the group of user devices different to the user device. If the user device is currently set as the primary user device, then in response to the capabilities notification, re-registering with the IMS to remove the user device as the primary user device for the services associated with the group of user devices.

As another option, the method includes receiving a capabilities notification from the capabilities exchange AS, the capabilities notification including a primary capability indication associated with the user device. If the user device is not currently set as the primary user device, then in response to the capabilities notification, registering with the IMS that the user device is the primary user device for the services associated with the group of user devices.

Optionally, the method may further include receiving a capabilities exchange notification from the AS. The capabilities exchange notification including data representative of a device identifier and one or more service capabilities associated with one or more devices in the group of devices. Storing the device identifiers and the one or more service capabilities, and identifying the relevant services associated with the group of user devices based on one or more service capabilities. Additionally, as an option, identifying the services associated with the group of user devices is based on IMS communication service identifiers, or IMS application reference identifiers received from the group of user devices. As another option, the user device is one of the devices in the group of user devices. Optionally, the method is performed by the user device or another user device in the group of user devices.

As an option, the method may further include receiving a service request associated with one of the group of user devices, determining one or more user device(s) from the group of user devices capable of handling the received service request, selecting a user device from the determined user device(s) for handling the call, and redirecting the received service request to the selected user device.

According to a second aspect of the invention there is provided a method of operating an AS in a communications network. The AS including the functionality of a capability exchange AS. The communications network includes an IMS and a group of user devices, the group of user devices being associated with an IMS user subscription or a multi-service user subscription. The method includes receiving a primary capability indication associated with a user device. The primary capability indication includes data representative of the user device being set as the primary user device for the group of devices for receiving all incoming service requests from services or relevant services associated with the group of user devices. Storing the primary capability indication associated with the user device, and notifying the primary capability indication associated with the user device to user devices in the group of user devices.

As an option, notifying further includes notifying the primary capability indication associated with the user device only to other user devices of the group of user devices when the primary capability indication associated with the user device is received from the user device. As another option, notifying may further include notifying the primary capability indication associated with the user device to the user device when the primary capability indication associated with the user device is received from another user device in the group of user devices.

Optionally, the method may include receiving a capabilities indication from one or more user devices in the group of user devices. Each capabilities indication notification including data representative of that device identifier and one or more service capabilities associated with that user device. Sending a capabilities exchange notification to each user device in the group of user devices, where the capabilities exchange notification includes data representative of the device identifiers of other user devices in the group of user devices, and/or one or more service capabilities associated with the other user devices in the group of devices. Additionally, the one or more service capabilities identify the services associated with the group of user devices based on ICSIs and/or IARIs.

Optionally, the data representative of the user device being the primary user device for the group of devices comprises a XML capability primary tag indicating whether the user device is the primary user device. Additionally, the XML capability primary tag may further include a privacy indication that indicates the XML capability primary tag can only be shared with user devices in the group of devices and/or trusted applications.

According to a third aspect of the invention there is provided an apparatus for use in routing or redirecting service requests to user devices in a communications network. The communications network including an IMS and an AS, where a group of user devices are associated with an IMS user subscription and the AS includes the functionality of a capabilities exchange AS. The apparatus includes a processor, receiver, transmitter, and a memory, the processor being coupled to the receiver, the transmitter, and the memory. The processor is configured to set a user device to be a primary user device of the group of user devices for receiving all incoming service requests from services associated with the group of user devices. The transmitter is configured to send a primary capability indication associated with the user device to a capability exchange AS for use in notifying the primary capability indication associated with the user device to other user devices in the group of user devices. The primary capability indication includes data representative of the user device being the primary user device for the group of devices.

As an option, the processor and transmitter are further configured to register with the IMS that the user device is the primary user device for the services associated with the group of user devices. Optionally, the processor is further configured to only select the user device from the group of user devices to be the primary user device.

Optionally, the processor and receiver are configured to receive a capabilities notification from the AS. When the capabilities notification includes a primary capability indication associated with another user device of the group of user devices different to the user device and if the user device is currently set as the primary user device, then in response to the capabilities notification, the processor and transmitter are further configured to re-register with the IMS to remove the user device as the primary user device for the services associated with the group of user devices. As another option, when the capabilities notification includes a primary capability indication associated with the user device and if the user device is not currently set as the primary user device, then in response to the capabilities notification, the processor and transmitter are further configured to register or re-register with the IMS that the user device is the primary user device for the services associated with the group of user devices.

According to a fourth aspect of the invention, there is provided an AS for use in a communications network, where the AS includes the functionality of a capabilities exchange AS. The communications network further includes IMS and a group of user devices, where the group of user devices are associated with an IMS user subscription or a multi-service subscription. The AS includes a processor, receiver, transmitter, and a memory, the processor being coupled to the receiver, the transmitter, and the memory. The processor and receiver are configured to receive a primary capability indication associated with a user device, where the primary capability indication comprising data representative of the user device being set as the primary user device for the group of devices for receiving all incoming service requests from services associated with the group of user devices. The memory is configured to store the primary capability indication associated with the user device. The processor and transmitter are configured to notify the primary capability indication associated with the user device to user devices in the group of user devices.

As an option, the processor and transmitter are further configured to notify the primary capability indication associated with the user device only to other user devices of the group of user devices when the primary capability indication associated with the user device is received from the user device. Additionally, as another option, the processor and transmitter are further configured to notify the primary capability indication associated with the user device to the user device when the primary capability indication associated with the user device is received from another user device in the group of user devices.

According to another aspect of the invention there is provided a computer program, including computer readable code means which, when run from a computer readable medium in the form of a memory in a processor in an apparatus or AS, causes the apparatus or AS to perform the methods or processes as described. As an option, there is provided a computer program product including a computer readable medium and a computer program as described, where the computer program is stored on the computer readable medium.

It is evident that the invention provides the advantage of providing improved user control of which user device out of a group of user devices associated with a user's subscription, i.e. an IMS subscription that may be a multi-service/device subscription. This is achieved using the capabilities exchange mechanism and allowing user devices to set a primary capability and publish the primary capability allowing other user devices in the group of user devices to be notified of changes in a user devices capabilities, and also allowing other user devices in the group of user devices to relinquish their primary status, i.e. remove themselves as the primary user device.

Further advantages of the present invention include improved end user experience in a multi-service/device IMS environment, dynamic setting initiated via selection (e.g. a "button" push on a user device) of a user device as a primary device for all the diverse services under a user's subscription. Another advantage provides other user devices in the group of user devices to delegate the primary device setting in which a user may use one user device to delegate setting another user device to be the primary user device in the group of user devices. In addition, existing technology and mechanisms are reused resulting in reduced time to market, costs, and complexity of implementing the invention.

BRIEF DESCRIPTION OF THE DRAWINGS

Some embodiments of the invention will now be described by way of example only and with reference to the accompanying drawings, in which.

DETAILED DESCRIPTION

In order to at least partially overcome the problems described above, it is proposed herein to improve the operation and performance of a communications network (e.g. an IP communications network) by ensuring the end user can dynamically select a user device of a group of user devices associated with the user's subscription to be a primary user device for receiving all the service requests the user has subscribed to.

The invention consists of using a mechanism provided by the network based on the existing capability exchange or service discovery mechanisms (e.g. see chapter 2.6.1 in "GSM RCC.07-Rich Communication Suite 5.1") by defining a primary capability tag or attribute that allows an end user to dynamically select a user device as primary for their multi-service subscription. When the user selects a user device as the primary user device, a primary capability of the selected device is set and the "primary" capability attributes are published towards the network which in turn notifies all other user devices in the group of devices, clients and applications that have subscribed to information on this primary capability. If previous user device in the group of user devices was previously set as the primary user device, then, on receipt of the notification that the selected user device has set a primary capability, the previous user device performs a re-registration with the network removing the previous user device as the primary user device for the services associated with the user subscription. The selected user device performs a re-registration/registration with the network such that all incoming requests are sent to and received by the selected user device. Additionally, on receiving an incoming request, the primary user device may display user devices of the group of devices capable of handing the incoming request for selection by the user, and may route/redirect the incoming request to a selected user device. Further examples of the invention will now be described by way of example only and with reference to the accompanying drawings.

Figure 1:
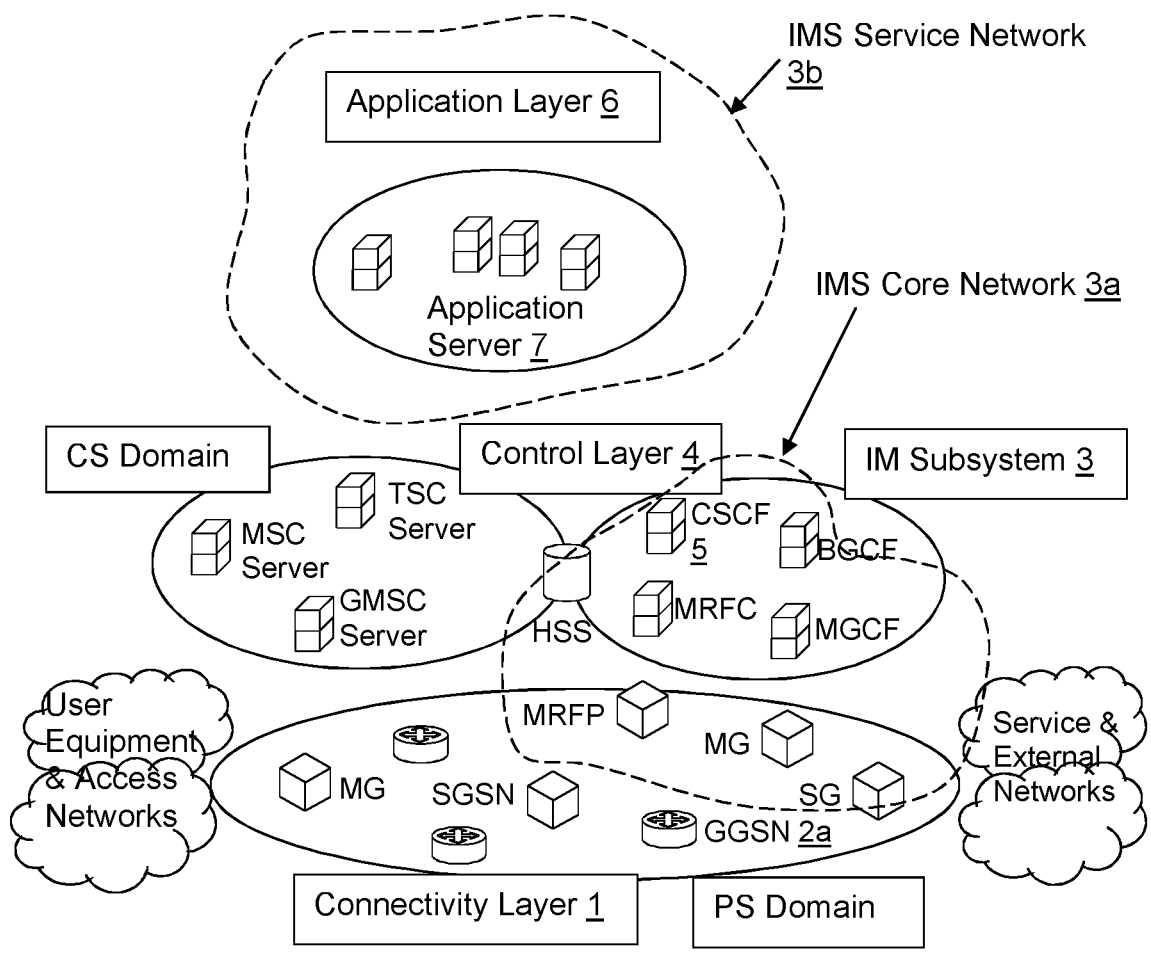
FIG. 1 is a schematic diagram illustrating a typical communications network.
Figure 2:
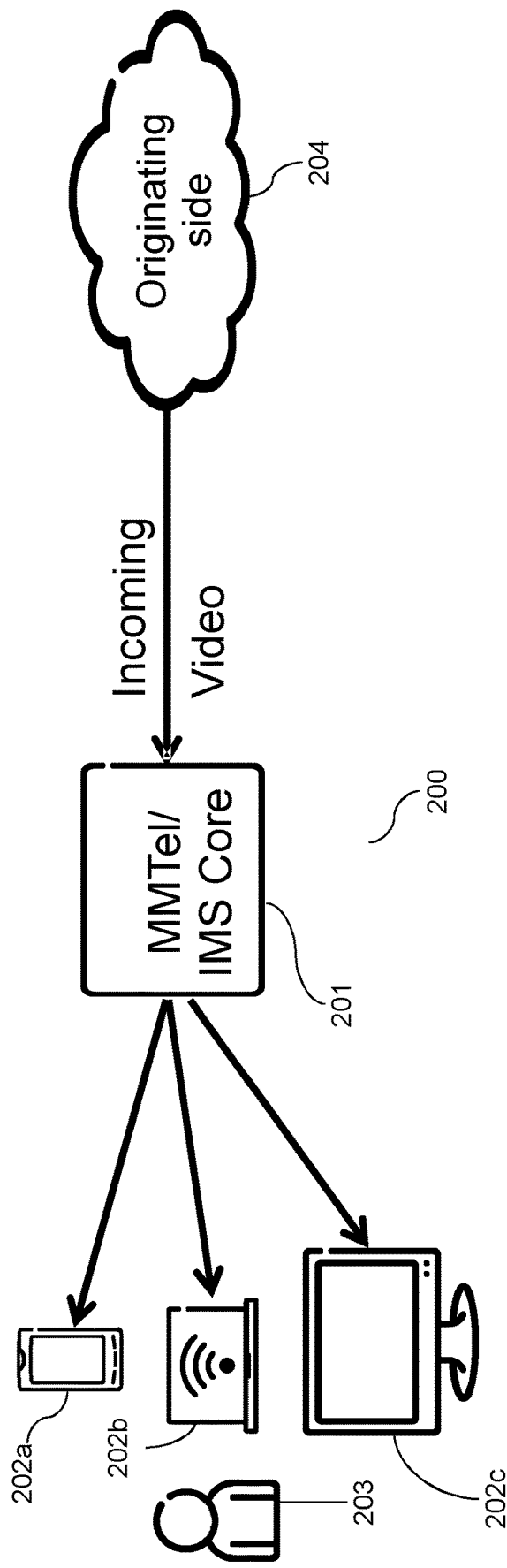
FIG. 2 is another schematic diagram illustrating the use of FCD in a typical communications network.
Figure 3A:
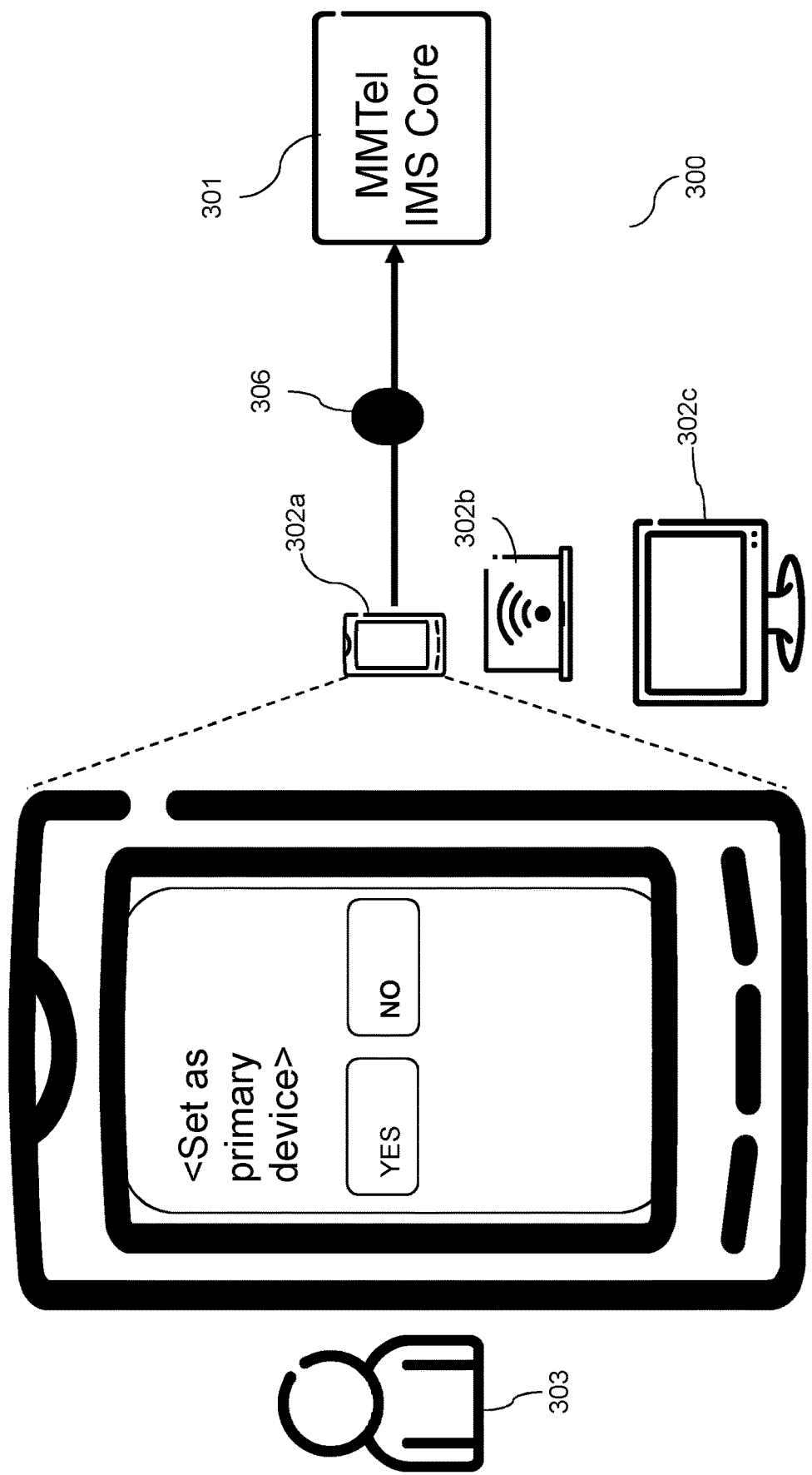
FIG. 3a is a schematic diagram illustrating an example process for routing or redirecting service requests to user devices according to the present invention.
Figure 3B:
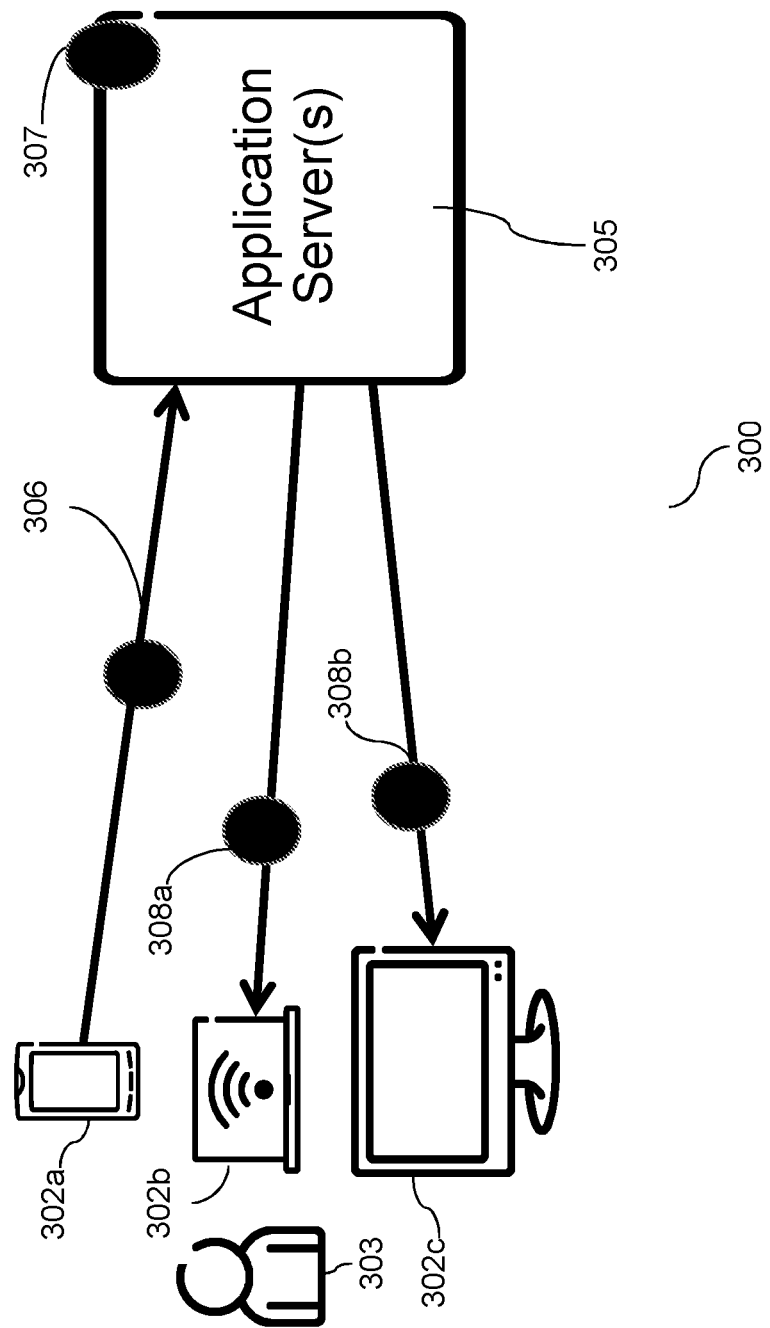
FIG. 3b is another schematic diagram illustrating the example process for routing or redirecting service requests to user devices according to the present invention.

FIGS. 3a and 3b are schematic diagrams for illustrating an example process for routing service requests or incoming calls to user devices based on a capability exchange mechanism in a communications network 300. The communications network 300 includes an IMS comprising an MMTel/IMS Core 301 and Application Server(s) 305 (e.g. a capability exchange AS). A user 303 may have a group of devices 302a-302c that are associated with an IMS subscription (i.e. a multi-service subscription).

Initially, each user device in the group of user devices 302a-302c registers with the communication network 300 before using communication services 300 (e.g. IP Core Access Network (IP CAN) connection and SIP register request(s) may be transmitted when performing IMS Registration for each user device). During registration each user device in the group of devices 302a-302c registers with the relevant services (e.g. ICSIs) associated with that user device and the multi-service subscription of the user 303. It is also assumed that each user device 302a-302b subscribes to changes on user level in relation to the capabilities of the other user devices in the group of user devices 302a-302c. In so doing, each user device 302a-302c publishes its capability using the capability exchange mechanism in terms of supported services to the AS 305, which may have the functionality of a capability exchange server. Each user device 302a-302c will then receive the corresponding incoming service requests or calls etc. associated with the services each user device 302a-302c has registered for.

It is also assumed that the second user device 302b was previously selected to be the primary user device such that each of the first and third user devices 302a and 302b had performed a re-registration with communications network 300 to remove the relevant services (e.g. ICSIs) being associated with the first and third user devices 302a and 302c. The second user device 302b had also previously performed a registration or re-registration with the communication network 300 to indicate to all the communication services (i.e. relevant services) associated with the user subscription and the group of devices 302a-302c that the second user device 302b should receive all incoming service requests, calls, etc. from these services.

As this point, the first user device 302a is configured to allow the user 303 to select the first user device 302a (e.g. a mobile phone) as the primary user device. The selection may be via a menu on the mobile phone or an application to set a configuration parameter on the phone, in which the first user device 302a is set as the primary device of the group of user devices for receiving all incoming service requests (e.g. incoming calls or incoming requests) from services associated with the group of user devices and the user's subscription. In selecting the first user device 302a to be the primary user device, a part of the user device's capabilities is set with a "Primary" capability tag or attribute. It is to be appreciated that the term "Primary" is used for simplicity, and that any suitable named capability tag or attribute may be used as long as such named capability tag or attribute it is interpreted or understood by the relevant user devices, clients, services, applications, application servers, and other relevant network or network elements as being a capability indicating that user device is set as the primary user device for receiving all incoming service requests, calls, etc. associated with services the user has subscribed to. The primary capability attribute or tag may include data representative of the primary capability.

Once set, data representative of the primary capability tag associated with the first user device 302a is sent or published towards the communication network 300. For example, in step 306, the first user device 302a sends a capability notification indicating the primary capability associated with the first user device 302a to an AS 305 in the communication network 300 (e.g. a capability exchange AS (CX-AS)) that includes the capability exchange functionality for storing and interpreting the capabilities sent to the AS 305 from the various user devices (e.g. the primary capability associated with the first user device 302a).

In step 307, the AS 305 determines that the second and third user devices 302b and 302c have subscribed to changes in the capability of the first user device 302a and should be sent the capability notification based on the received primary capability associated with the first user device 302a. The primary capability indication includes data representative of the user device 302a being the primary user device for the group of devices 302a-302c. The AS 305 interprets that the data representative of the primary capability should be sent only to those user devices, services or applications that are authorised to receive the primary capability indication associated with the first user device 302a.

In order to assist the AS 305 to determine that the primary capability associated with the first user device 302a should be sent to authorised user devices, services and applications, the data representative of the primary capability tag or attribute for the first user device may include further data representative of a "privacy" marking, such that the AS 305 can immediately identify that the primary capability should be treated differently and so should only be notified to authorised user devices, services or applications etc. For example, the primary capability tag associated with the first user device 302a will be treated by the AS 305 as private data and will only include this capability in the list of capabilities when sending the list to other devices or trusted applications under the control of the user (e.g. other user devices in the group of devices 302a-303c associated with the user and/or the user's multi-service subscription). In another example, the AS 305 determines that the primary capability is to be published to those user devices that have subscribed to receive changes in the capabilities of the first user device 302a and that are authorised to receive a capability change notification for the first user device 302a based on the primary capability. That is, the received primary capability is handled as private data and will be published towards user devices that are associated with the same user IMS subscription or multi-service subscription. From this, the AS 305 determines that user devices 302b and 302c from the group of devices 302a-203c associated with the IMS subscription of user 303 should receive the received primary capability associated with the first user device 302a.

In steps 308a and 308b, the AS 305 sends a capability notification to second and third user devices 302b and 302c because these devices have subscribed to be notified of capability changes of first user device 302a). The capability notification includes data representative of the primary capability associated with the first user device 302a.

When the second user device 302b receives the capability notification from the AS 305 in step 308a, because the second user device 302b is currently designated or set as a primary user device for the group of devices 302a-302c, the second user device 302b is configured to interpret the primary capability associated with the first user device 302a to mean that the first user device 302a has been set as the primary user device. The second user device 302b is further configured to perform a re-registration with the communication network 300 removing all the relevant communication services (e.g. ICSIs and/or IARIs) for which the second user device 302b was designated the primary user device. This then removes the second user device 302b as the primary user device for all the services (the relevant services) associated with the group of user devices 302a-302c. The relevant services will now not send any incoming service requests, calls etc. to the second user device 302b.

In addition, the first user device 302a, on being selected as the primary user device, and after publication of the primary capability to AS 305 performs a registration and/or a re-registration with the communication network 300 (e.g. the IMS) to add the first user device 302a as the primary user device for all the relevant communication services (e.g. ICSIs and/or IARIs) associated with the user devices 302a-302c. This means the first user device 302a is set as the primary user device and will now receive all incoming service requests, calls etc. from the relevant services associated with the group of user devices 302a-302c.

When the third user device 302c receives the capability notification from the AS 305 in step 308c, because the third user device 302c is not designated or set as a primary user device, the third user device 302c is configured not to act on the primary capability notification associated with the first user device 302a, but stores the information for future use.

As previously described, the capability exchange mechanisms may use XML with the service capabilities and capability notifications being based on XML. The capabilities may be defined using elements and attributes that are indicated in XML using tags etc. The capability notifications may include data representative of the user device 302a being the primary user device for the group of devices 302a-302c, such data may be defined of in the form of an XML capability primary tag indicating whether the user device 302a is the primary user device. The XML capability primary tag may be configured to include a privacy indication that indicates the XML capability primary tag should only be shared with trusted user devices, e.g. user devices in the group of devices 302a-302c associated with a user subscription and/or trusted applications, services and other network nodes.

Figure 3C:
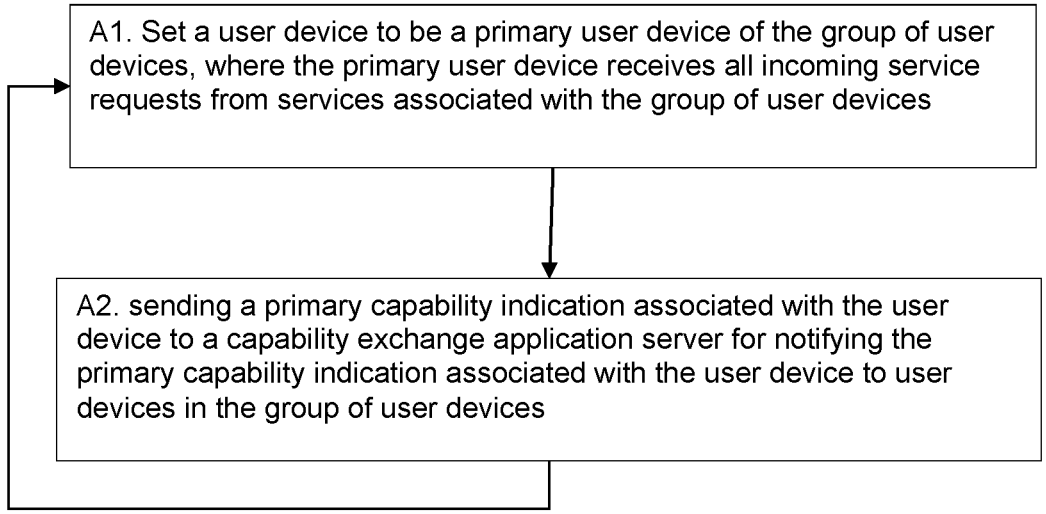
FIG. 3c is a flow diagram illustrating another example process for use by an apparatus of user device in routing or redirecting service requests to user devices according to the present invention.

FIG. 3c is a flow diagram illustrating an example process for routing service requests in the communications network 300. The communication network 300 includes an IMS 301 and an AS 305 with the functionality of a capability exchange mechanism. The group of user devices 302a-302c are associated with an IMS user subscription or a multi-service subscription of the user 303. The process performed by one or more of the user devices in the group of user devices 302a-302c includes the following steps:

A1. Setting one of the user devices 302a-302c to be a primary user device of the group of user devices 302a-302c for receiving all incoming service requests from services associated with the group of user devices 302a-302c.

A2. Sending data representative of a primary capability indication associated with the selected user device to the AS 305 for use in notifying the primary capability indication associated with the set user device to other user devices in the group of user devices 302a-302c. The primary capability indication includes data representative of the set user device being the primary user device for the group of devices 302a-302c.

If the user device 302a that is used to set one of the user devices 302a-302c as the primary user device is set as the primary user device, then the method may further include registering with the IMS that the user device is the primary user device for the services associated with the group of user devices.

If another of the user devices is to be set as the primary device, the method may further include receiving a capabilities notification from the AS 305, the capabilities notification including a primary capability indication associated with said another user device 302b of the group of user devices 305 different to the user device 302a. If the user device 302a is currently set as the primary user device, then in response to the capabilities notification, re-registering with the IMS to remove the user device 302a as the primary user device for the services associated with the group of user devices.

If another of the user devices sets the user device 302a to be the primary user device, the method may further include receiving a capabilities notification from the AS 305, the capabilities notification including a primary capability indication associated with the user device 302a. If the user device 302a is not currently set as the primary user device, then in response to the capabilities notification, registering or re-registering with the IMS that the user device 302a is the primary user device for the services associated with the group of user devices 302a-302c.

Setting one of the user devices to be a primary user device further includes selecting the user device 302a from the group of user devices 302a-302c to be the primary user device. Prior to selecting one of the user devices from the group of user devices 302a-302c, the user device from which the selection is made may include receiving a capabilities exchange notification from the AS 305, the capabilities exchange notification including data representative of a device identifier and one or more service capabilities associated with one or more devices in the group of devices. Storing the device identifiers and the one or more service capabilities. Identifying the services associated with the group of user devices based on one or more service capabilities. The device identifiers may be used for selecting one or the devices from the group of user devices 302a-302c as the primary user device.

The method may further include receiving a service request associated with one of the group of user devices 302a-302c, determining one or more user device(s) from the group of user devices capable of handling the received service request, selecting a user device from the determined user device(s) for handling the service request or call, and redirecting the received service request to the selected user device.

Figure 3D:
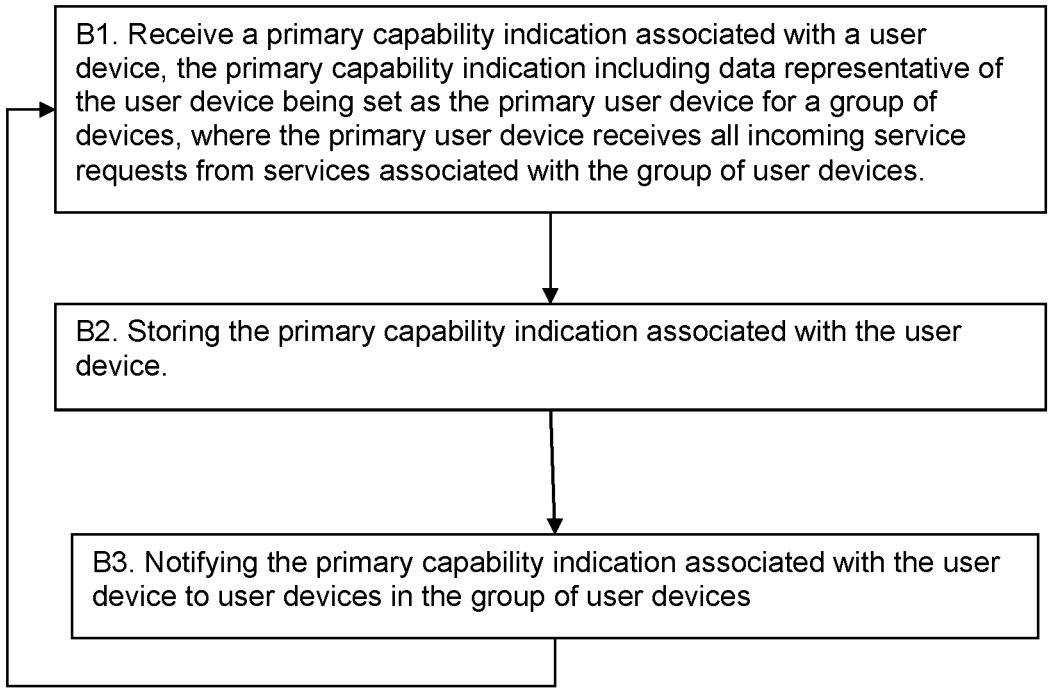
FIG. 3d is a flow diagram illustrating the another example process for use by an application server in routing or redirecting service requests to user devices according to the present invention.

FIG. 3d is a flow diagram illustrating an example process for routing service requests in the communications network 300. The communication network 300 includes an IMS 301 and an AS 305 with the functionality of a capability exchange mechanism. The group of user devices 302a-302c are associated with an IMS user subscription or a multi-service subscription of the user 303. The process performed by the AS 305 includes the following steps:

B1. Receiving a primary capability indication associated with a user device of the group of user devices 302a-302b. The primary capability indication includes data representative of one of the user device(s) being set as the primary user device for the group of devices 302a-302b, where the primary user device receives all incoming service requests or calls etc. from services associated with the group of user devices 302a-302c.

B2. Storing the received primary capability indication associated with the user device.

B3. Notifying the primary capability indication associated with the user device to user devices in the group of user devices 302a-302c.

Step B3 may further include notifying the primary capability indication associated with a user device 302a only to other user devices 302b-302c of the group of user devices 302a-302c when the primary capability indication associated with the user device 302a is received from the user device 302a.

Step B3 may further include notifying the primary capability indication associated with the user device 302a to the user device 302a when the primary capability indication associated with the user device 302a is received from another user device 302b or 302c in the group of user devices 302a-302c.

Step B2 may further include storing the received primary capability indication associated with the user device in a storage medium, memory or database for use in retrieving and notifying user devices of the capabilities and/or capability changes associated with the user device.

The method may further include receiving one or more capabilities indication notification(s) from one or more user devices in the group of user devices 302a-302c, each capabilities indication notification including data representative of that device's identifier and one or more service capabilities associated with that user device. Sending a capabilities exchange notification to each user device in the group of user devices 302a-302c, the capabilities exchange notification including data representative of the device identifiers of other user devices in the group of user devices 302a-302c and one or more service capabilities associated with the other user devices in the group of devices. The one or more service capabilities may identify the services associated with the group of user devices 302a-302c based on ICSI(s).

Figure 3E:
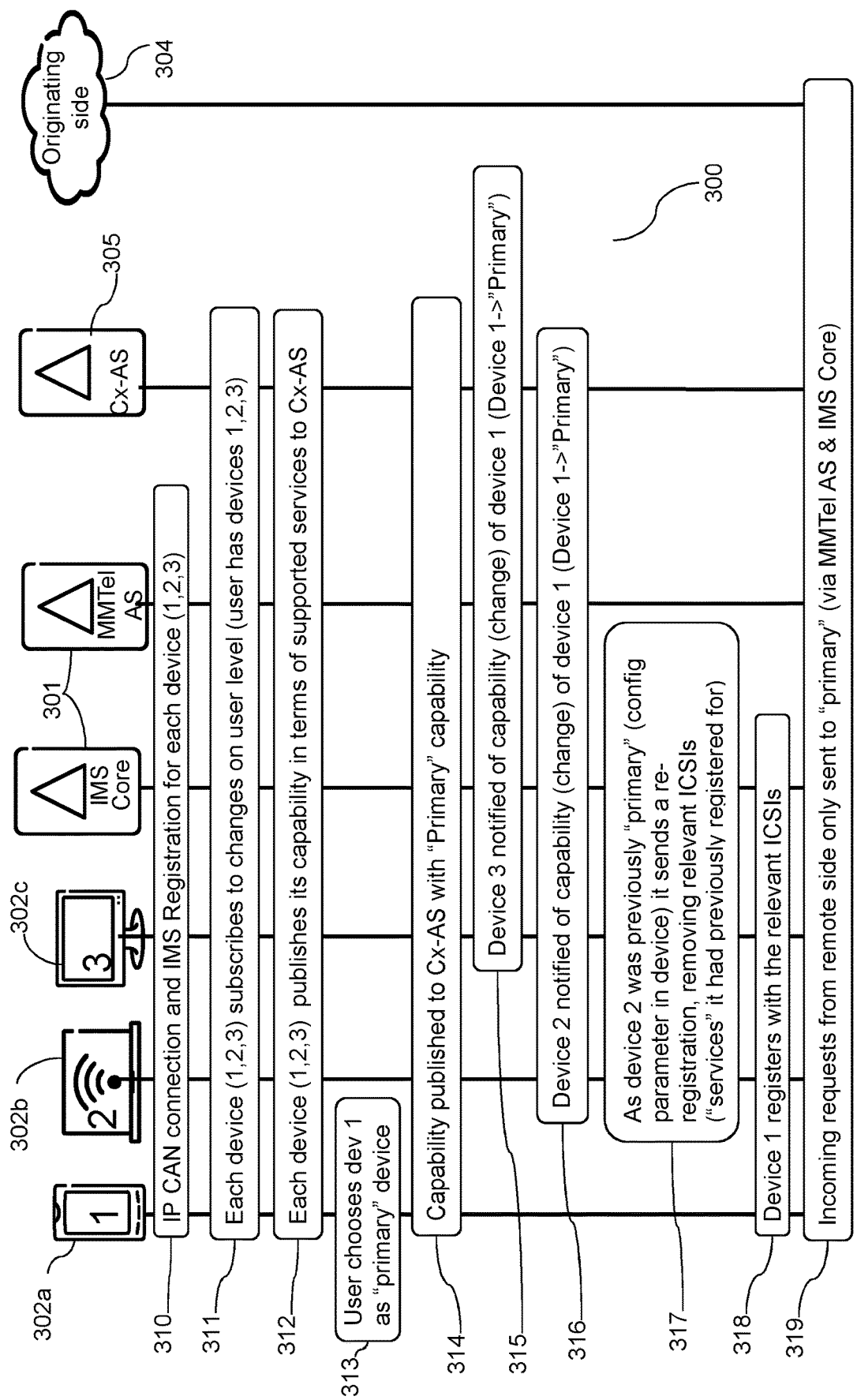
FIG. 3e is a signalling diagram illustrating a further example process for routing or redirecting service requests to user devices according to the present invention.

FIG. 3e illustrates a signalling flow diagram illustrating another example of a process according to the invention for routing incoming service requests to user devices 302a-302c in communications network 300 as described with reference to FIGS. 3a-3d. In this example, communications network 300 includes the IMS comprising an IMS Core/MMTel AS 301 and an AS 305 including the functionality of a capability exchange server (e.g. a CX-AS). The first, second and third user devices 302a, 302b and 302c (e.g. a mobile telephone, a laptop and a TV) may receive originating/incoming service/session requests, originating calls etc., from other user devices in an originating side 304 (or remote end) of the communications network 300. It is assumed that the user devices 302a-302c constitute a group of user devices 302a-302c associated with a multi-service subscription or IMS subscription of user 303.

Initially, in step 310 each device 302a-302c performs an IP CAN connection and IMS registration to allow the user devices 302a-302c to access/communicate with the relevant services associated with IMS subscription of the user 303 and/or other user devices over communication network 300. The IMS Core and MMTel AS 301 registers each user device 302a-302c. In step 311 each user device 302a-302c subscribes with the AS 305 to receive changes at the user level of the capabilities of each device in the group of user devices 302a-302c. In step 312, each user device 302a-302c publishes its capability in terms of supported services to the AS 305. The AS 305 may store the published capability associated with each user device 302a-302c in a storage medium, memory or database for use in retrieving and notifying user devices of the capabilities and/or capability changes associated with each user device 302a-302c that subscribes with AS 305 to receive changes of the capabilities of user devices in the group of user devices 302a-302c. The AS 305 may then notify each user device 302a-302c of the capabilities of other user devices.

At this point, each user device 302a-302c will receive service requests or calls from services (e.g. ICSIs) that the corresponding user device 302a-302c will have registered for. Once the user 303 has selected one of the user devices 302a-302c to be a primary user device, each of the user devices 302a-302c will be notified by the AS 305 and all of the relevant services associated with the user devices 302a-302c are re-registered to be associated with the selected user device 302b. That is, each user device 302a-302c will perform a re-registration with the communication network 300 to remove the services or relevant services associated with that user device. The selected user device 302b performs a registration or re-registration with the communication network 300 to add all the relevant services associated with the user devices 302a-302c of the group of user devices 302a-302c. Therefore, incoming service requests or calls etc., are sent to the selected user device. In this example, it is assumed that the second user device 302b has been previously selected as the primary user device, and that the second user device 302b has performed the appropriate registration or re-registration with the communication network 300 via the IMS such that the relevant services (e.g. ICSIs) for all the user devices in the group of device 302a-302c are sending incoming service requests or calls, etc., to the second user device 302b.

In step 313, the user 303 may then use the first user device 302a and select and set the first user device 302a to be the "primary" user device. This means the primary capability is added to the list of capabilities of the first user device 302a. In step 314, the first user device 302a publishes capability change or the primary capability to the AS 305. That is, the first user device 302a transmits to the AS 305 a capability notification indicating the first user device 302a has been set as the primary user device. The capability notification will include data representative of the primary capability. On receiving the capability notification from the first user device 302a, the AS 305 interprets or recognises that the primary capability in the capability notification is only to be used as private data and should only be published to trusted applications, services, and/or other user devices such as the other user devices in the group of user devices 302a-302c associated with the IMS subscription of user 303.

In steps 315 and 316 the AS 305 transmits a capability exchange notification to the second and third user devices 302b and 302c indicating the capability change of the first user device 302a, i.e. the first user device 302a is now set to have a primary capability. In step 315, since the third user device 302c is not set as the current primary user device—i.e. the third user device 302c does not have the primary capability attribute or configuration parameter in its list of capabilities—the third user device 302c does not act on the received capability exchange notification. In step 316, since second user device 302b is currently set as the primary user device—i.e. the second user device 302b has the primary capability attribute or configuration parameter within its list of capabilities, the second user device 302b acts on the received capability exchange notification to remove itself as the primary device, because the user 303 has now selected the first device 302a as the primary user device. To do this, in step 317 the second user device 302b, sends a re-registration request (e.g. a SIP register message) to the communication network 300 (e.g. towards the IMS core 301) including data for removing the relevant services (e.g. ICSIs) that it had previously registered for. This means that all future incoming service requests or calls, etc., will not be sent to the second user device 302b. At step 318, the first user device 302a performs a registration or re-registration with the communication network 300 to register all the relevant services (e.g. ICSIs) such that all future incoming service requests or calls, etc. are sent to the first user device 302a. In step 319, incoming service requests or calls from the originating side or remote side 304 are now sent via MMTel AS and IMS Core 301 to the primary user device, which is the first user device 302a.

Figure 4A:
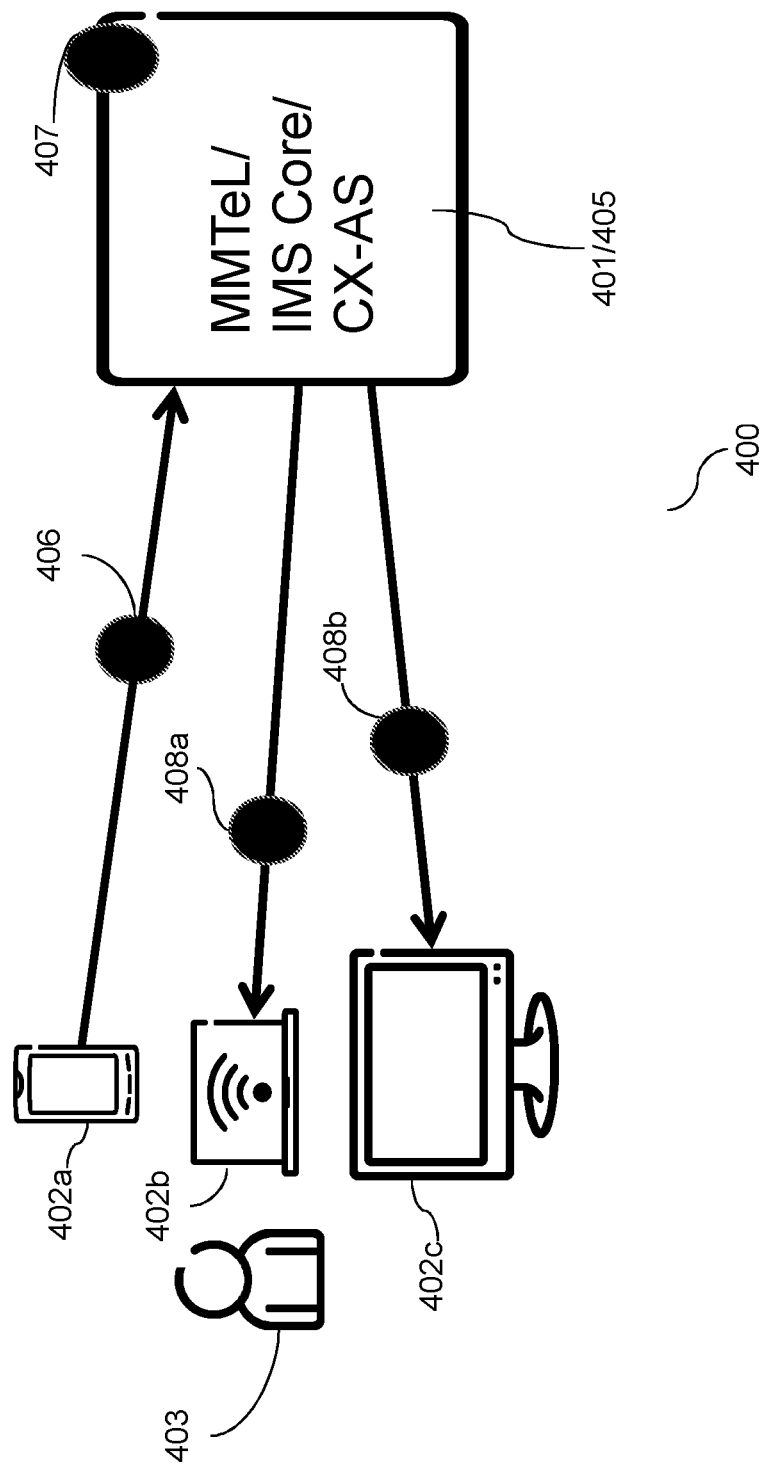
FIG. 4a is a schematic diagram illustrating an example process for routing or redirecting service requests to user devices according to the present invention.

FIG. 4a is a schematic diagram illustrating another example process according to the invention for routing service requests, incoming requests or calls to user devices 402a-402c based on a capability exchange mechanism in a communications network 400. The communications network 400 includes an IMS comprising an MMTel/IMS Core 401 and a capability exchange AS 405. A user 403 has a group of devices 402a-402c that are associated with an IMS subscription (i.e. a multi-service subscription).

As an example, the user 403 may have several user devices 402a-402c registered at home (e.g. a mobile phone, laptop, TV) and associated with a multi-service subscription or an IMS subscription. This means each user device 402a-402c may be associated with one or more several services (e.g. MMTel voice & video, presence etc.). The process according to the present invention is based on using existing capability exchange or service discovery mechanisms (e.g. see chapter 2.6.1 in "GSM RCC.07-Rich Communication Suite 5.1") such that a user 403 may dynamically select a user device of a group of user devices 402a-402c as primary for their multi-service subscription. In one example, the selected user device sets a "primary" capability attribute(s) and publishes its "primary" capability attributes towards the communication network 400 via the IMS Core/MMTel 401 and AS 405. The AS 405 may store the published primary capability associated with the selected user device in a storage medium, memory or database for use in retrieving and notifying user devices of the capabilities and/or capability changes associated with the selected user device. The AS 405 notifies all user devices 402a-402c, clients and applications that have subscribed to receive information on the primary capability.

For example, with reference to FIG. 4a, in step 406, using existing capability exchange discovery mechanisms the user 402 sets the first user device 402a to have a service capability called "primary" based on a configuration parameter, which is called the primary capability. The primary capability is a service capability that can be set on a user device indicating that user device is the primary user device for receiving all service requests for relevant services associated with a group of user devices 402a-402c, which may be related to a multi-service or IMS subscription of a user 403. The primary capability can be classified as "private", indicating to capability exchange application servers 405 that only authorised user devices, trusted applications or services may subscribe to receive notifications relating to the primary capability. In step 406, the first user device 402a publishes the capability change towards the communication network 400, which is received by the AS 405.

The AS 405 is configured to include capability exchange and service discovery mechanisms that are able to interpret the "primary" capability. It is also assumed, prior to step 406, that the AS 405 has received subscriptions by interested user devices or applications to receive events related to the "primary" service capability. Given the primary capability can be classified as "private", the interested user devices will typically be authorised user devices such as user devices in a group of user devices 402a-402c associated with a multi-service or IMS subscription of a user 403. The AS 405 may then, using the capability exchange mechanisms, notify user devices in group of user devices 402a-402c that have subscribed and authorised to receive changes in the primary capability.

In steps 408a and 408b, as user devices 402a-402c have subscribed with AS 405 to receive capability notifications or information on the primary capability, then when the first user device 402a is set to be the primary user device in steps 406 and 407, the AS 405 sends capability exchange notifications to user devices 402b and 402c notifying these devices of the change in "primary" status of the first user device 402a. If any one of these other user devices 402b and 402c were previously set to have the primary capability, then that user device 402b or 402c issues a re-register (e.g. a SIP registration message) removing the relevant services and/or ICSIs. The first user device 402a issues a re-register to add the relevant services and/or ICSIs such that all incoming service requests for the relevant services and/or ICSIs associated with the group of user devices 402a-402c are sent only to the first user device 402a. The user 403 may, at a later stage, set another user device in the group of user devices 402a-402c to be the primary user device, and so the above process is repeated in respect of that newly selected user device.

Figure 4B:
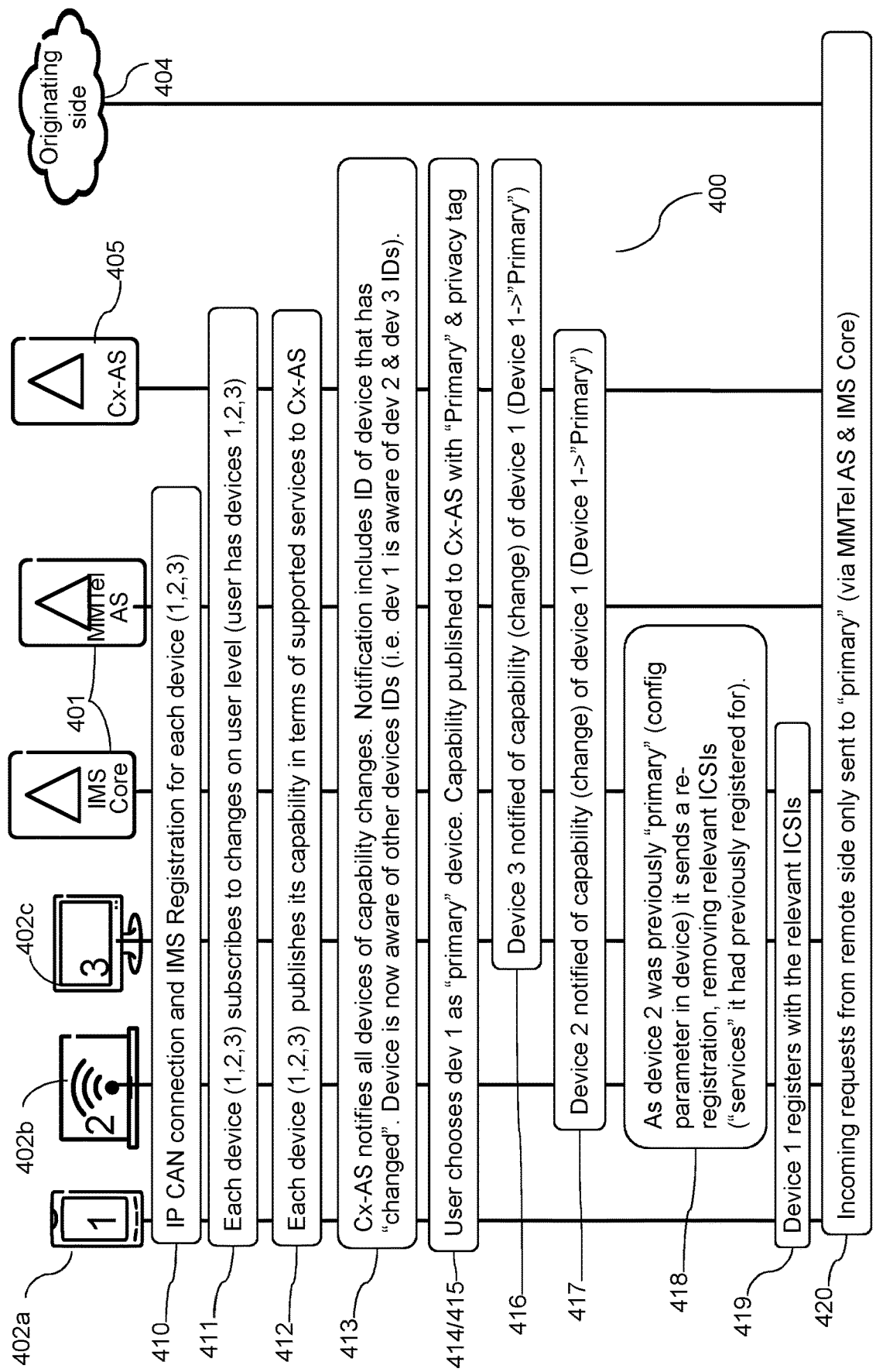
FIG. 4b is a signalling diagram illustrating the example process for routing or redirecting service requests to user devices according to the present invention.

FIG. 4b is a signalling diagram illustrating another example process according to the invention for routing service requests, incoming requests or calls to user devices based on capability exchange mechanisms. The communication network 400 as described with respect to FIG. 4c further includes and originating or remote side 404 from which incoming service requests or calls may be sent to user devices 402a-402c.

Initially, in step 410 each user device 402a-402c of the group of user devices 402a-402c performs an IP CAN connection and IMS registration to allow the user devices 402a-402c to access/communicate with the relevant services associated with IMS subscription of the user 403 and/or other user devices over communication network 400. The IMS Core and MMTel AS 401 registers each user device 402a-402c. In step 411 each user device 402a-402c subscribes with the AS 405 to receive changes at the user level of the capabilities of each device in the group of user devices 402a-402c. In step 412, each user device 402a-402c publishes its capability in terms of supported services to the AS 405. The AS 405 may store the published capabilities associated with each user device 402a-402c in a storage medium, memory or database for use in retrieving and notifying user devices of the capabilities and/or capability changes associated with each user device 402a-402c that subscribes with AS 405 to receive changes of the capabilities of user devices in the group of user devices 402a-402c. The AS 405 may then notify each user device 402a-402c of the capabilities of other user devices.

In this example, in step 413, the AS 405 notifies the user devices 402a-402c of capability changes in respect of the other user devices 402a-402c. The capability notification(s) sent from the AS 405 to each user device 402a-402c may include data representative of the identity of each user device 402a-402c that has "changed" such that each of the user devices 402a-402c is now aware of the identities of the other user devices in the group of user devices 402a-402c. For example, the first user device 402a is made aware or stores the identities of the second user device 402b and third user device 402c, the other user devices 402b and 402c are similarly aware. Similarly, the user devices 402a-402c also publish their supported services and/or service ICSIs, which are also notified to the AS 405 using the capability exchange mechanism. The AS 405 in turn notifies each user device 402a-402c accordingly, which stores the relevant services and/or service ICSIs associated with each device 402a-402c. This means that each user device 402a-402c may be made aware of the services each other user device 402a-402c has registered for.

At this point, each user device 402a-402c will receive service requests or calls from services (e.g. ICSIs) that the corresponding user device 402a-402c has registered for. Using the primary capability mechanism as described herein, the user 403 may then select and set one of the user devices 402a-402c to be the primary user device using the primary capability, which is published towards the AS 405. The AS 405 stores or updates its database in relation to the setting and publishing of the primary capability associated with the selected user device. The AS 405 then notifies all of the user devices 402a-402c, which user device has been set as the primary user device. Given all the user devices 402a-402c are all registered with their respective services, each user device 402a-402c that has not been set as the primary user device then re-registers with the communication network 400 removing the relevant services associated with that user device. The user device that is set as the primary user device, re-registers with the communication network 400 to add the relevant services associated with the group of user devices 402a-402c. Note, the user device that is set as the primary user device does not need to re-register the services that the user device has registered with. In this case, it is assumed that the user 403 set the second user device 402b as the primary user device such that incoming service requests/calls etc., for all relevant services associated with the group of devices 402a-402c are sent/routed to the second user device 402b.

In step 414, the user 403 decides to select the first user device 402a to be the primary user device. For example, a configuration parameter in first user device 402a may be set to indicate the first user device 402a has a primary service capability. This may be represented by a primary tag or attribute that is set as part of the capabilities of the first user device 402a. In this example, the primary capability includes data representative of a "privacy" marking and is set as part of the service capabilities of the user device 402a that is sent/published towards the communication network 400.

As previously described, the capability exchange mechanisms may use XML with the service capabilities and capability notifications being based on XML. The capabilities may be defined using elements and attributes that are indicated in XML using tags etc. The capability notifications may include data representative of the user device 402a being the primary user device for the group of devices 402a-402c, such data may be defined of in the form of an XML capability primary tag indicating whether the user device 402a is the primary user device. The XML capability primary tag may be configured to include a privacy indication that indicates the XML capability primary tag should only be shared with trusted user devices, e.g. user devices in the group of devices 402a-402c associated with a user subscription and/or trusted applications, services and other network nodes.

The primary capability may include a "privacy" marking that can be used to categorise the primary capability as "private" or "public". For example, in a more generic framework/mechanism service capabilities may be categorized as "private" and "public". This can be achieved by including data representing a "privacy" marking to any service capability of a user device, the "privacy" marking indicating the service capability is for "private" use by authorised or trusted user devices, clients, applications and/or services subscribing to receive service capabilities of the user device. The service capability may be categorized as "public" by the absence of a "privacy" marking, service capabilities that are categorized as "public" may be sent to any user device, client, application, or service that has subscribed to receive service capabilities of the user device.

For example, an existing service capability in a publish operation for the Image Share IARI may be based on the following piece of XML (see chapter 2.6.1.1.2 in "GSM RCC.07-Rich Communication Suite 5.1"):

+g.3gpp.iari-ref="urn%3Aurn-7%3A3gpp-application.
ims.iari.gsma-is"

A generic capability exchange mechanism would categorize this service capability as "public". The communication network 400, in particular AS 405, is configured to understand that this capability can be distributed/notified to all user devices that have subscribed.

If a service capability or capability tag can be defined as being categorized as "private" then the communication network 400, or AS 405, can be configured to interpret such service capabilities as "private" and can be configured to only distribute these so-categorised service capabilities to authorised user devices, clients, applications and services that have subscribed. This can be either achieved by defining a service capability to always be categorised as "private" or by marking any service capability with a "private" marking or data that can be parsed by the AS 405 to determine whether the service capability is categorised as "private" or "public". That is absence of a "privacy" marking indicates the service capability is categorised as "public", and presence of a "privacy" marking indicates the service capability is to be categorised as "private".

For example, the above-mentioned service capability for the Image Share IARI may be configured to include a "privacy" marking as follows:

+g.3gpp.iari-ref="urn%3Aurn-7%3A3gpp-application.
ims.iari.gsma-is" Private

The "privacy" marking comprises the term "Private" and it is to be appreciated by the person skilled in the art that the "privacy" marking may comprise any suitable data so long as the service capability is parsed and interpreted by the AS 405 as being categorised as "private". When the communication network 400, or the AS 405, receives the above service capability it parses the service capability and categorises it as "private" and notifies the appropriate user devices, clients, applications, and/or services accordingly.

This means that the primary service capability may either be defined to always be categorised as "private" or the service capability definition is extended to include data representative of a "privacy" marking that indicates whether the service capability is to be categorised as "private", or in the absence of the "privacy" marking it is categorised as "public".

In step 415, in this example, the primary service capability is further defined to include data representative of a "privacy" marking that may be parsed by the AS 405, where the presence of the "privacy" marking indicates the primary service capability is to be treated as "private" or only notified to authorised or trusted user devices, clients, applications, or services. The primary capability or primary capability tag with privacy marking is published or sent to the communication network 400 and received by the AS 405, which stores or updates the memory or database associated with the published capabilities of the user devices 402a-402c.

The communication network 400 and AS 405 understands that the primary capability tag with "privacy" marking needs to be treated as private as opposed to other service capabilities without the "privacy" marking. The AS 405 will determine those authorised user devices that are categorised as trusted or private, i.e. the group of user devices 402a-402c under the control of the user 403 requesting the primary capability.

In steps 416 and 417, the AS 405 transmits capability notifications or notifications on the capability changes i.e. the first user device 402a being set with the primary service capability to those user devices in the group of user devices 402a-402c or trusted applications that have previously subscribed to receive changes in service capabilities for the first user device 402a. The AS 405 may also be configured to check and update its database associated with the capabilities of the group of user devices 402a-402c to take into account that the first user device 402a has been set as the primary service capability, e.g. other devices that were previously set to have the primary service capability may be updated. For example, the AS 405 may check and update the capabilities associated with each user device stored in the AS 405 memory and/or database. Alternatively or additionally, the AS 405 may simply notify the other user devices of the capability changes and wait for those devices to update and publish their capabilities. In step 416 the third user device 402c is notified of the capability change of the first user device 402a, which has been set to include the primary service capability. In step 417, the second user device 402b is notified of the capability change of the first user device 402a, which has been set to include the primary service capability.

In step 418, for those user devices that previously were set to have the primary service capability, these user devices perform a re-registration with the communication network 400 to remove the relevant services (e.g. ICSIs) associated with the group of user devices 402a-402c. Instead of requiring the AS 405 to check and update the capabilities of the group of user devices 402a-402c, these user devices may instead remove the primary capability from their list of capabilities and publish the capability changes to cause the AS 405 to update its memory/database associated with the capabilities of the group of user devices 402a-402c. In this example, the second user device 402b was previously set to have the primary service capability, and so the second user device 402b sends a re-register to the communication network 400 (e.g. the IMS core 401) to remove the relevant ICSIs such that all applications and services associated with the group of user device 402a-402c and the user 403 in the communication network are now aware that they should not send incoming request, calls or session/service requests to the second user device 402b. As the first user device 402a has now been set to have the primary service capability, in step 419, the first user device 402a performs a re-registration with the communication network 400 to add the relevant services (e.g. ICSIs) associated with the group of user devices 402a-402c. That is, the first user device 402a sends a re-register to the communication network 400 adding the relevant services such that the incoming service requests, session requests, calls, etc., are sent to the first user device 402a. For example, in step 420, incoming requests from the originating side or remote side 404 are only sent to the primary user device (now the first user device 402a) via the IMS Core/MMTel AS 401.

Figure 4C:
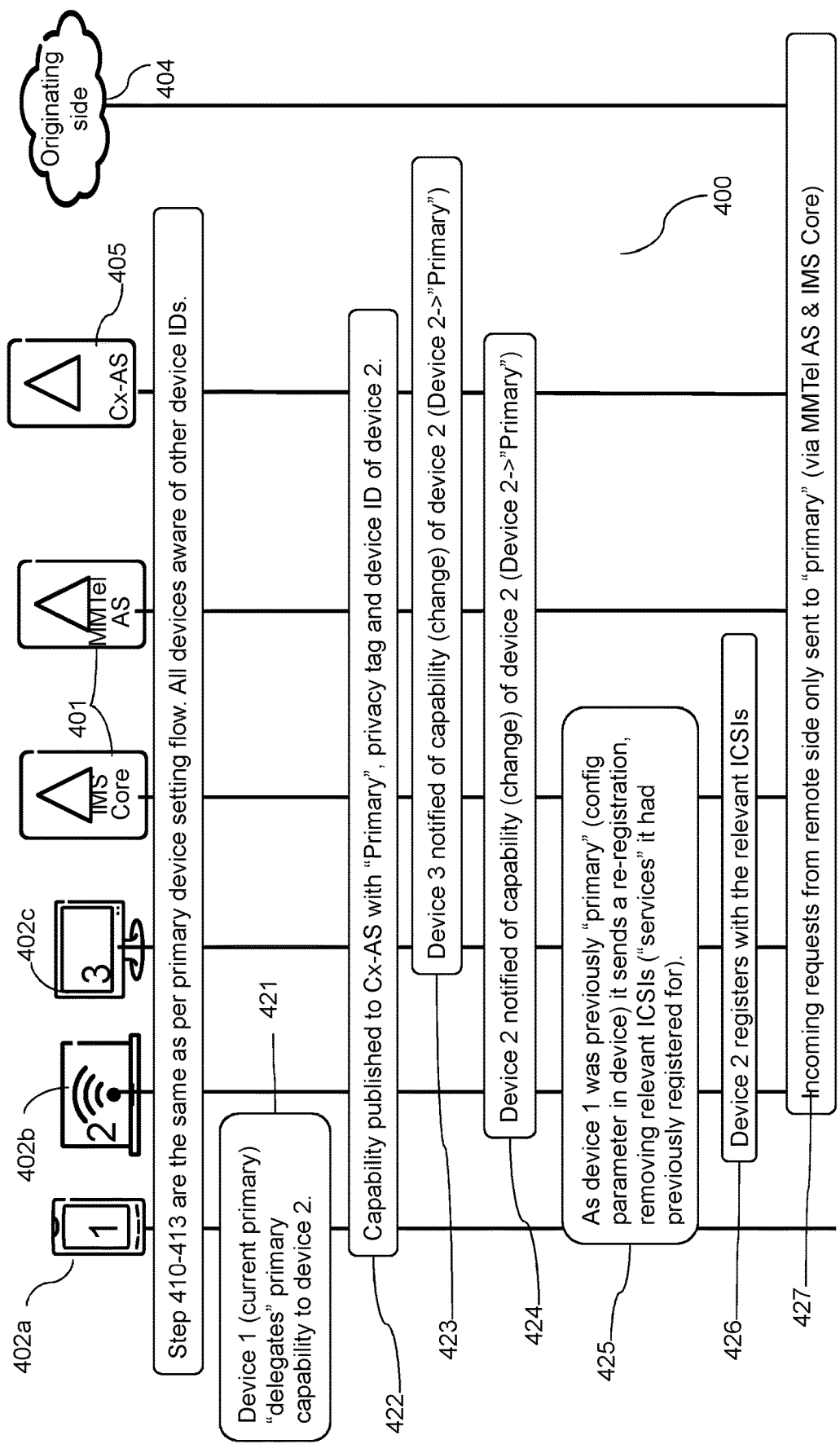
FIG. 4c is a signalling diagram illustrating another example process for routing or redirecting service requests to user devices from a delegating user device according to the present invention.

FIG. 4c a signalling diagram illustrating another example process according to the invention for routing service/session requests, incoming requests or calls to user devices based on capability exchange mechanisms. The communication network 400 has been described with respect to FIG. 4b.

Initially, in steps 410-413 are the same as those described with reference to FIG. 4b for setting the primary user device such that all user devices 402a-402c are aware of the identities of the other user devices 402a-402c. In this example, it is assumed that the first user device 402a is the current primary user device. In step 421, the user 403 uses the first user device 402a to set another user device of the group of user devices 402a-402c as the primary user device. That is, the first user device 402a delegates the primary capability to another user device in the group of user devices 402a-402c. In this case, the user 403 uses the first user device 402a to select the second user device 402b to be the primary user device.

In step 422, the first user device 402a sends or publishes the primary capability associated with the second user device 402b to the AS 405. The primary capability includes data representative of the primary service capability, a "privacy" marking or tag, and the identity of the second user device 402b. The AS 405 may also be configured to check and update its database associated with the capabilities of the group of user devices 402a-402c to take into account that the first user device 402a has set the second user device 402b to have the primary service capability. The AS 405 notifies all other user devices 402b and 402c, apart from the first user device 402a, of the capability change of the second user device 402b, which is to be set to have the primary service capability. In step 423, the AS 405 sends a capability notification to the third user device 402c indicating that the second user device 402a now has the primary service capability. As the third user device 402c is not the current primary user device, the third user device 402c is configured to not perform any action in response to the notification. In step 424, the AS 405 sends a capability notification to the second user device 402b indicating the capability change associated with the second user device 402b, which has been set by the first user device 402a to have the primary capability and so become the primary user device.

In step 425, as the first user device 402a was previously set to have the primary service capability, the first user device 402a performs a re-registration with the communication network 400 to remove the relevant services (e.g. ICSIs) associated with the group of user devices 402a-402c it has previously registered for. The first user device 402a may also update its capabilities to remove the primary capability from its capabilities, which may be published in the usual manner associated with capability exchange to update the AS 405. In step 426, the second user device 402b includes the primary capability as part of its service capabilities, and performs a registration or re-registration with the communication network 400 to add the relevant services (e.g. ICSIs) associated with the group of user devices 402a-402c. That is, the second user device 402b sends a re-register to the communication network 400 adding the relevant services such that the incoming service requests, session requests, calls, etc., are sent to the second user device 402b. For example, in step 427, incoming requests from the originating side or remote side 404 are only sent to the primary user device (now the second user device 402b) via the IMS Core/MMTel AS 401.

Figure 5A:
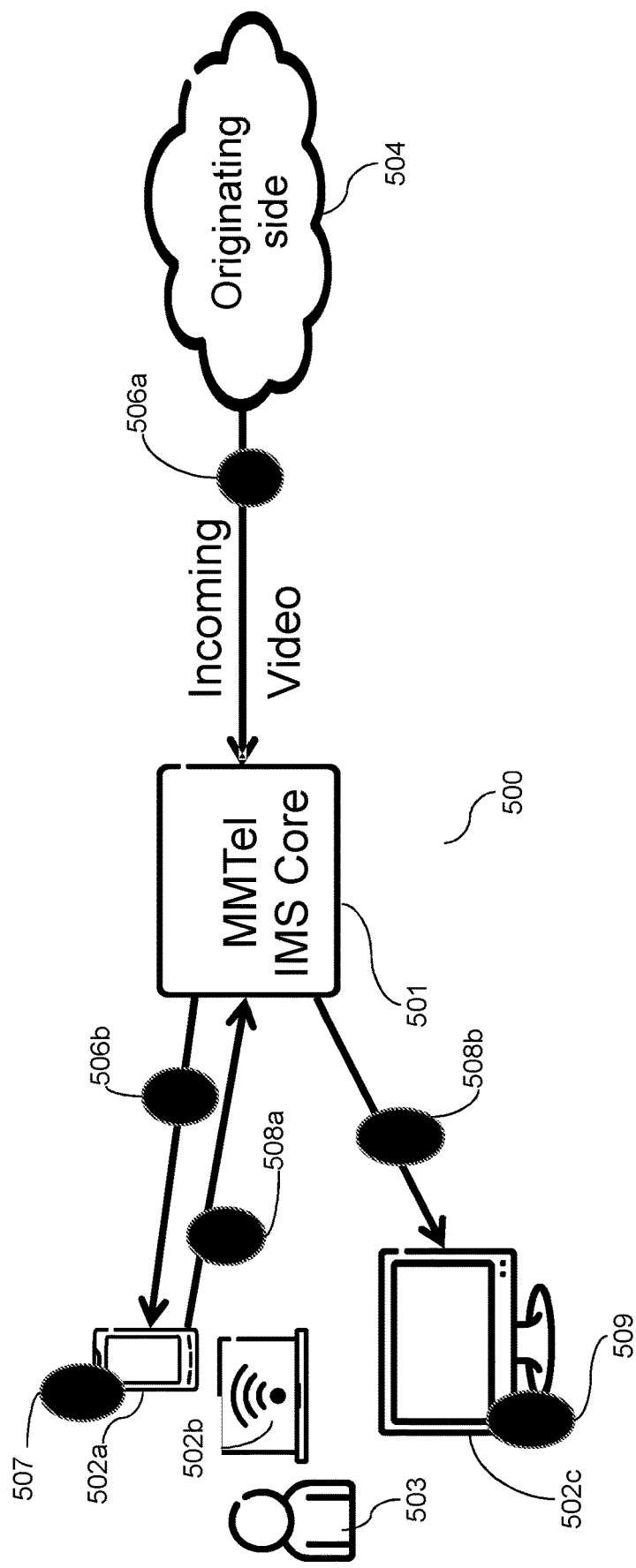
FIG. 5a is a schematic diagram illustrating a further example process for routing or redirecting service requests to user devices according to the present invention.
Figure 5B:
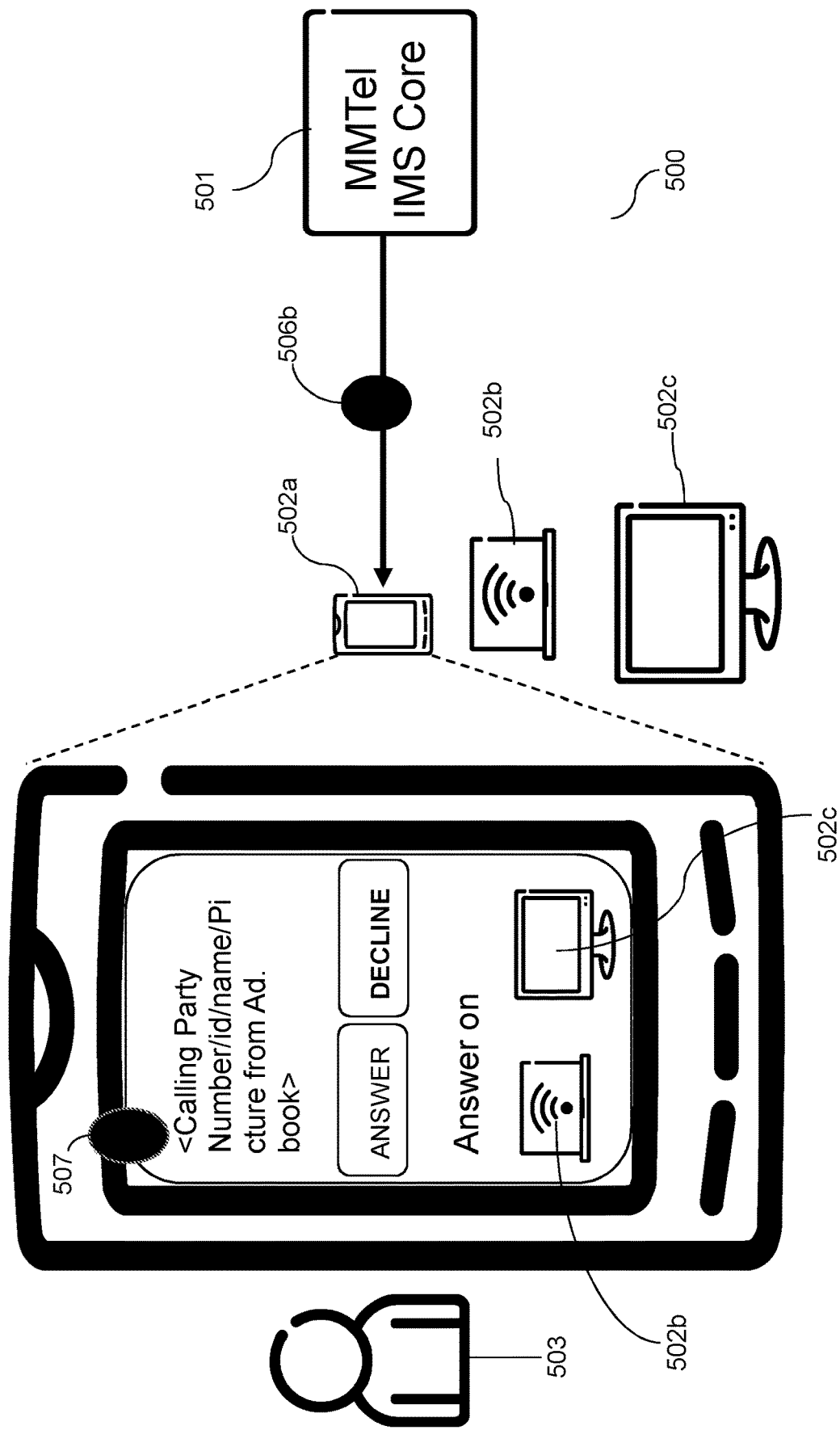
FIG. 5b is a schematic diagram illustrating the further example process for routing or redirecting service requests to user devices according to the present invention.

FIGS. 5a and 5b are schematic diagrams illustrating a further example process according to the invention for further routing of incoming service/session requests and/or calls, etc. to user devices 502a-502c in a communications network 500. In this example, the communications network 500 includes an IMS comprising an MMTel/IMS Core 501 and an originating side or remote side 504 of the communications network 500. A user 503 may have a group of devices 502a-502c that are associated with an IMS subscription (i.e. a multi-service subscription).

It is assumed that each user device in the group of user devices 502a-502c is registered with the communication network 500 as previously described with reference to FIGS. 3a-4c. It is also assumed that one of the user devices 502a-502c has been selected as the primary user device for the group of user devices 502a-502c according to invention as previously described with reference to FIGS. 3a-4c. In this case the first user device 502a has been designated as the primary user device and has been registered with the communications network 500 in respect of all the relevant services associated with the group of user devices 502a-502c and the IMS subscription or multi-service subscription of user 503. The primary user device is also aware or has stored the list of all the service capabilities and the identities of the other devices in the group of devices 502a-502c.

The first user device 502a is configured to include a selection and routing mechanism 507 allowing the user 503 to decide on which of the group of user devices 502a-502c that the user 503 may respond or answer an incoming session/service request or call. The first user device 502a includes menu or application allowing the user 503 to select one of the user devices 502a-502c from a list or set of user devices that match the capabilities of the incoming service request. In this example, the user 503 has designated the first user device 502a as the primary user device, the user 503 may designate any other user device in the group of user devices 502a-502c as the primary user device. It is also assumed that the user 503 is reachable at the primary user device, which is the first user device 502a. The remaining user devices 502b and 502c are considered to be secondary.

In operation, the first user device 502a will receive all incoming requests or calls from other user devices in, for example, the originating side 504 of communications network 500. This may consist of ringing only the primary user device, the first user device 502a, where the selection mechanism 507 displays the identity of all user devices matching the requested service capabilities associated with the incoming service request. The user 503 selects a suitable user device and transfers or routes the incoming service request to the selected user device via the IMS Core/MMTel 501.

FIGS. 5a and 5b illustrate the selection and routing mechanism 507 for an incoming video call originating from the originating side 504 of the communication network 500.

In step 506a, another user device in the originating side 504 of the communication network 500 transmits a video call request towards the user 503. The IMS Core/MMTel 501 receives the incoming video call and since the first user device 502a has been set as the primary user device, and the network 500 is aware that all incoming requests/sessions, calls etc. associated with the relevant services for user 503 should be routed to the first user device 502a. In step 506a, the IMS Core/MMTel 501 sends the incoming video call to the first user device 502a, thus the user 503 gets the video call on the primary user device. On receiving the incoming video call, the selection and routing mechanism 507 indicates that the incoming request is a video call by showing, by way of example, a camera. The selection and routing mechanism 507 also displays on the display of the first user device 502a any other user device in the group of user devices 502a-502c that are capable of handling the call. In this case, as it is a video call, the selection and routing mechanism 507 displays both the second and third user devices 502b and 502c as these are determined to be able to handle the call. The first user device 502a is also able to handle the video call, so the user 503 is also provided with the option to answer the video call on the first user device 502*a*. By way of example only, the user 503 selects the third user device 502*c* for handling the incoming video call. In step 508*a*, the first user device 502*a* then redirects/routes the incoming video call via the IMS Core/MMTel 501 to third user device 502*c*. In routing the video call, the first user device 502*a* includes the identity of the third user device 502*c* allowing the IMS Core/MMTel 501 to route the video call to the third user device 502*c*. In step 508*b*, the video call is then routed or redirected from the IMS Core/MMTel 501 to the third user device 502*c* (e.g. the TV), where in step 509 the third user device 502*c* processes the call. In this example, the video call may be an MMTel service, however, it is to be appreciated by the person skilled in the art that any incoming request associated with other services, such as presence, chat or any other RCS service etc. may be redirected/routed in this fashion.

Figure 5C:
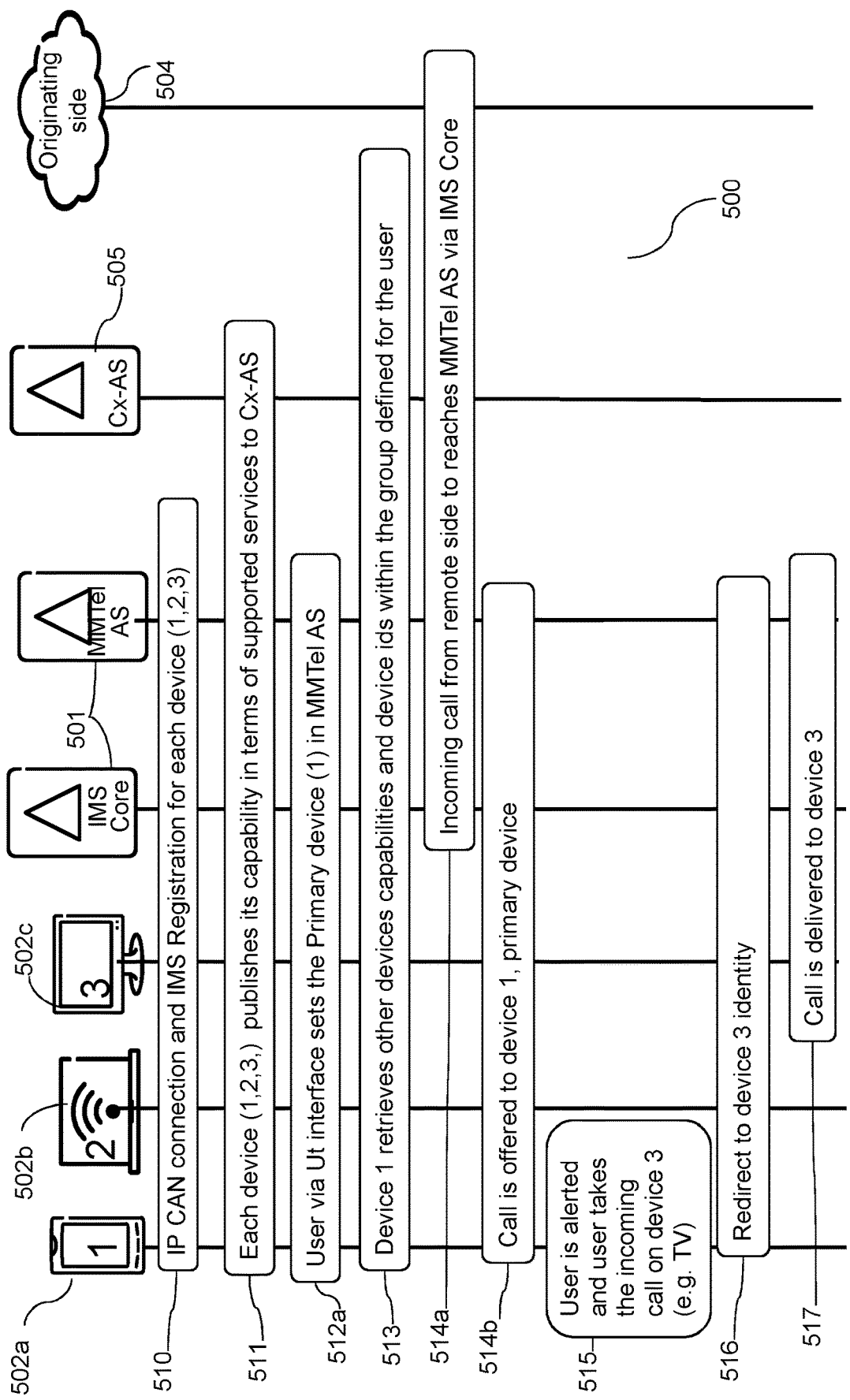
FIG. 5c is a signalling diagram illustrating another example process for routing or redirecting service requests to user devices from a delegating user device according to the present invention.

FIG. 5*c* illustrates a signalling flow diagram illustrating another example process of the selection and routing mechanism according to the invention. The communication network 500 as described with respect to FIGS. 5*a* and 5*b* is illustrated and further includes a capability exchange application service 505 or AS 505.

Initially, in step 510 each user device 502*a*-502*c* of the group of user devices 502*a*-502*c* performs an IP CAN connection and IMS registration to allow the user devices 502*a*-502*c* to access/communicate with the relevant services associated with IMS subscription of the user 503 and/or other user devices over communication network 500. The IMS Core and MMTel AS 501 registers each user device 502*a*-502*c*. In step 511 each user device 502*a*-502*c* publishes its capability in terms of supported services that each device 502*a*-502*c* is capable of handling to the AS 505, the AS 505 may then notify each user device 502*a*-502*c* of the capabilities of the other user devices in the group of user devices 502*a*-502*c*. In this example, in step 512*a*, the user 503 of the first user device 501*a* sets, via the Ut interface, the first user device 502*a* to be the primary user device in the MMTel AS 501. In step 513, the first user device retrieves or subscribes to the AS 505 to retrieve the capabilities and device identities of the other devices 502*a*-502*c* in the group of devices 502*a*-502*c* associated with the user 503 and the IMS/multi-service subscription of the user 503. In this manner, the first user device 501*a* is set as the primary user device and the communication network 500 is aware that all incoming service requests should be routed to the first user device 501*a*.

Another user device (not shown) in the originating side 504 of communications network 500 initiates a call (e.g. a video call or other service request) with user 503. In step 514*a*, the IMS core/MMTel 501 received the incoming call from the originating side 504 (remote side) of the communications network. In step 514*b*, the IMS Core/MMTel 501, being aware that the first user device 502*a* is the primary user device, routes the incoming call to the first user device 501*a*.

In step 515, according to the selection and routing mechanism 507 on the first user device 501*a*, the user 503 is alerted to the incoming call and selects from a list or a display of user devices in the group of user devices 502*a*-502*c* that are capable of handling the incoming call a suitable user device for taking the call. The selection and routing mechanism 507 uses the retrieved device capabilities of the group of user devices 502*a*-502*c* to display the suitable user devices for taking the call. In this case, the first user device 502*a* displays that the third user device 502*c* is capable of handling the call and the user 503 selects the third user device 502*c*. In step 516, the first user device 502*a* routes or redirects the incoming call to the third user device 502*c* via the IMS Core/MMTel 501 using the identity of the third user device 502*c*. In step 517, the IMS Core/MMTel 501 delivers the incoming call to the third user device 502*c*, which then beings to handle the incoming call and communicate with the other user device in the originating side 504 of the communication network 500.

Figure 5D:
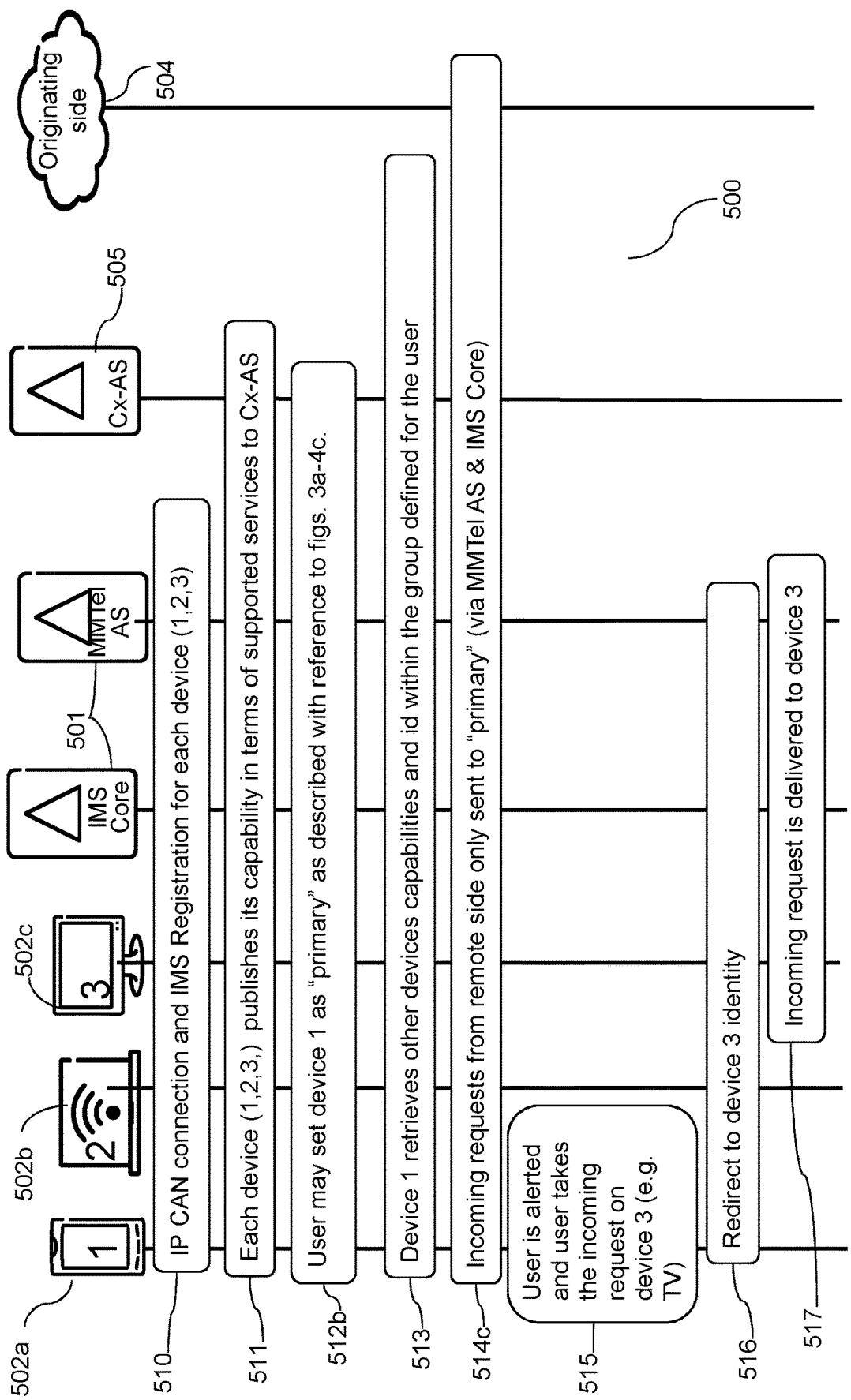
FIG. 5d is a signalling diagram illustrating another example process of a selection and routing mechanism according to the present invention.

FIG. 5*d* illustrates another signalling flow diagram illustrating a further example process of the selection and routing mechanism according to the invention. The communication network 500 as described with respect to FIGS. 5*a* to 5*c* is illustrated.

Steps 510 and 511 are similar to those described with reference to FIG. 5*c*. In this example, in step 512*b*, the user 503 of the first user device 501*a* sets the first user device 501*a* as the primary user device using the capability exchange mechanisms and example processes as described with reference to FIGS. 3*a* to 5*b*. In this way, the incoming requests for all the relevant services associated with the group of user devices 502*a*-502*c* will be routed to the first user device 502*a*. In step 513, the first user device may retrieves the capabilities and device identities of the other devices 502*a*-502*c* in the group of devices 502*a*-502*c* associated with the user 503 and the IMS/multi-service subscription of the user 503. In this manner, the first user device 501*a* is set as the primary user device and the communication network 500 is aware that all incoming service requests should be routed to the first user device 501*a*.

Another user device (not shown) in the originating side 504 of communications network 500 initiates a call (e.g. a video call or other service request) with user 503. In step 514*c* the incoming call is routed via the IMS core/MMTel 501 to the first user device 502*a*. In step 515, according to the selection and routing mechanism 507 on the first user device 501*a*, the user 503 is alerted to the incoming call and selects from a list or a display of user devices in the group of user devices 502*a*-502*c* that are capable of handling the incoming call a suitable user device for taking the call. The selection and routing mechanism 507 uses the retrieved device capabilities of the group of user devices 502*a*-502*c* to display the suitable user devices for taking the call. In this case, the first user device 502*a* displays that the third user device 502*c* is capable of handling the call and the user 503 selects the third user device 502*c*. In step 516, the first user device 502*a* routes or redirects the incoming call to the third user device 502*c* via the IMS Core/MMTel 501 using the identity of the third user device 502*c*. In step 517, the IMS Core/MMTel 501 delivers the incoming call to the third user device 502*c*, which then beings to handle the incoming call and communicate with the other user device in the originating side 504 of the communication network 500.

As previously described, the capability exchange mechanisms may use XML with the service capabilities and capability notifications being based on XML. The capabilities may be defined using elements and attributes that are indicated in XML using tags etc. The capability notifications may include data representative of the user device 502*a* being the primary user device for the group of devices 502*a*-502*c*, such data may be defined of in the form of an XML capability primary tag indicating whether the user device 502*a* is the primary user device. The XML capability primary tag may be configured to include a privacy indication that indicates the XML capability primary tag should only be shared with trusted user devices, e.g. user devices in the group of devices 502*a*-502*c* associated with a user subscription and/or trusted applications, services and other network nodes.

Figure 6:
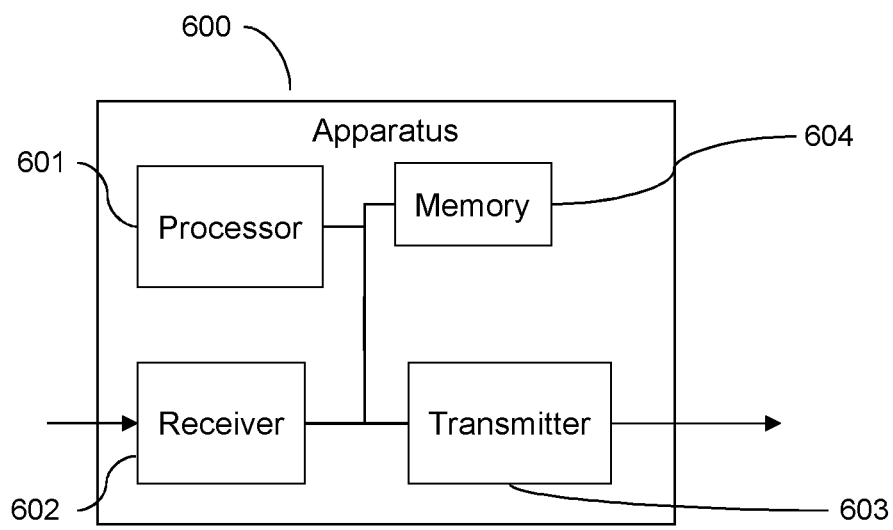
FIG. 6 is a schematic illustration of an example server according to the invention.

FIG. 6 is a schematic illustration of an apparatus 600 (e.g. a user device) for use in a communication network such as an IP network comprising a plurality of user devices. The communications network includes an IMS and capability exchange application server, where a group of user devices in the communication network are associated with an IMS user subscription. The apparatus 600 includes a processor 601, receiver 602, transmitter 603 and memory 604, the processor 601 being coupled to the receiver 602, the transmitter 603 and the memory 604. The memory 604 may be configured to include or store service capabilities of the apparatus, and/or service capabilities of one or more user devices in the group of user devices. The apparatus 600 may be communicatively coupled via receiver 601 and transmitter 603 to the communications network and also the capability exchange AS.

In operation, the processor 601 is configured to set a user device to be a primary user device of the group of user devices for receiving all incoming service requests from services associated with the group of user devices. The processor 601 and transmitter 603 are further configured to send a primary capability indication associated with the user device to the capability exchange AS for use in notifying the primary capability indication associated with the user device to other user devices in the group of user devices. The primary capability indication includes data representative of the user device being the primary user device for the group of devices.

The processor 601 and transmitter 603 are further configured to register with the IMS that the user device is the primary user device for the services associated with the group of user devices. The processor 601 and receiver 602 are configured to receive a capabilities notification from the capabilities exchange AS, the capabilities notification including a primary capability indication associated with another user device of the group of user devices different to the user device associated with the apparatus. If the user device is currently set as the primary user device, then in response to the capabilities notification, the processor 601 and transmitter 603 are further configured to register or re-register with the IMS to remove the user device as the primary user device for the services associated with the group of user devices.

Alternatively or additionally, the processor 601 and receiver 602 are configured to receive a capabilities notification from the capabilities exchange application server, where the capabilities notification includes a primary capability indication associated with the user device. If the user device is not currently set as the primary user device, then in response to the capabilities notification, the processor 601 and transmitter 603 are further configured to register or re-register with the IMS that the user device is the primary user device for the services associated with the group of user devices.

The processor 601 may be further configured to only select the user device from the group of user devices to be the primary user device. It is to be appreciated that the apparatus 600 may be implemented on one or more user devices of the group of user devices.

The receiver 602 may be further configured to receive a capabilities exchange notification from the capability exchange AS, where the capabilities exchange notification includes data representative of a device identifier and one or more service capabilities associated with one or more user devices in the group of user devices. The processor 601 and memory 604 are configured to store the device identifiers and the one or more service capabilities, and to identify the services associated with the group of user devices based on one or more service capabilities. The processor 601 is further configured to identify the services associated with the group of user devices based on IMS communication service identifiers (ICSIs) for the group of user devices.

The processor 601 and receiver 602 may be further configured to receive a service request or incoming call associated with one of the group of user devices. For example, the service request or incoming call may originate from another user device in the communication network. The processor 601 is further configured to determine one or more user device(s) from the group of user devices capable of handling the received service request based on the stored service capabilities associated with the group of user devices. The processor 601 is further configured to display a selection of the determined user devices capable of handling the service request, and allow a user select a user device from the determined user device(s) for handling the service request or incoming call. The processor 601 and transmitter 603 are further configured to redirecting or route the received service request via the communication network to the selected user device using the identity of the selected user device.

The data representative of the user device being the primary user device for the group of devices may be based on an XML capability primary tag indicating whether the user device is the primary user device. In addition, the XML capability primary tag may further include a privacy indication that indicates the XML capability primary tag can only be shared with user devices in the group of devices and/or trusted applications.

Figure 7:
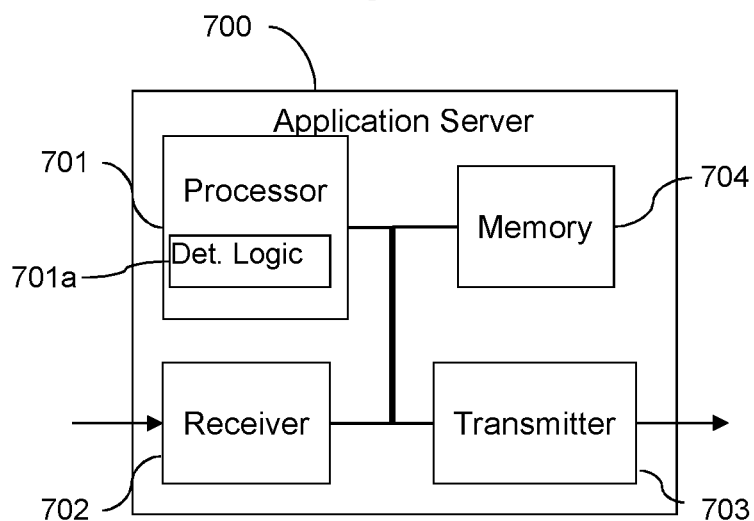
FIG. 7 is a schematic illustration of an example apparatus according to the invention.

FIG. 7 is a schematic illustration of an application server 700 for use in a communications network that includes an IMS and a group of user devices associated with an IMS user subscription or a multi-service subscription. The application server 700 includes the functionality of a capabilities exchange application server, or capabilities exchange mechanism as described herein. The application server includes a processor 701, a receiver 702, a transmitter 703, and a memory 704, the processor 701 being coupled to the receiver 702, the transmitter 703, and the memory 704.

In operation, the processor 701 and receiver 702 are configured to receive a primary capability indication associated with a user device. The primary capability indication includes data representative of the user device being set as the primary user device for the group of devices and for receiving all incoming service requests from services associated with the group of user devices. The memory 704 is configured to store the primary capability indication associated with the user device. For example, the memory or storage medium may be a database associated with storing capabilities for each of the user devices in the group of user devices, which the AS may use to retrieve and notify user devices of any capability changes etc. accordingly. For example, the AS 405 may check and update the capabilities associated with each user device stored in the AS 405 memory and/or database when a capability change associated with a user device occurs. Alternatively or additionally, the AS may simply notify the user devices of any capability changes they have subscribed to and wait for those devices to update and publish their capabilities before updating the database. The processor 701 and transmitter 703 are configured to notify the primary capability indication associated with the user device to user devices in the group of user devices.

If the user device that transmitted the primary capability indication to the AS 700 is set as the primary user device, the processor 701 and transmitter 703 are further configured to notify the primary capability indication associated with the user device only to other user devices of the group of user devices when the primary capability indication associated with the user device is received from the user device. Should another user device of the group of user devices have transmitted the primary capability indication associated with the user device to the AS 700, then the processor 701 and transmitter 703 are further configured to also notify the primary capability indication associated with the user device to the user device when the primary capability indication associated with the user device.

The data representative of the user device being the primary user device for the group of devices may be based on an XML capability primary tag indicating whether the user device is the primary user device. In addition, the XML capability primary tag may further include a privacy indication that indicates the XML capability primary tag can only be shared with user devices in the group of devices and/or trusted applications.

The user devices, application servers, apparatus and computing systems as described herein each may further perform the methods and processes as described herein. The processors of such devices, servers, apparatus, or systems are configured to execute computer program instructions based on the methods and processes described herein, such instructions being contained in a computer-readable medium or non-transitory computer readable medium, such as memory. The computer program instructions may be read into memory from another computer-readable medium or from another device via a communication interface. The instructions contained in memory cause the processor of a user device, application server, apparatus or other such computer system to perform processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

In addition, there is provided a computer program, comprising computer readable code means which, when run from a computer readable medium in the form of a memory in a processor in an application server, causes the application server to perform the associated steps of the methods or processes as described. Additionally or alternatively, there is provided a computer program product comprising a computer readable medium and a computer program as described, where the computer program is stored on the computer readable medium. Further, there is provided a computer program, comprising computer readable code means which, when run from a computer readable medium in the form of a memory in a processor in an apparatus, user device or network entity, causes the apparatus, use device or network entity to perform the associated steps of the methods or processes as described. As an option, there is provided a computer program product comprising a computer readable medium and a computer program as described, where the computer program is stored on the computer readable medium.

Although the invention has been described in terms of example solutions or preferred embodiments as set forth above, it should be understood that these examples or embodiments are illustrative only and that the claims are not limited to only those examples or embodiments. Those skilled in the art will be able to make modifications and alternatives in view of the disclosure which are contemplated as falling within the scope of the appended claims. Each of the features, steps, servers or apparatus disclosed or illustrated in the present specification may be incorporated into the invention, whether alone or in any appropriate combination with any other feature, step, or apparatus, user device, application server, node as disclosed or illustrated herein.

The invention claimed is:

1. A method of operating a user device in a group of user devices to route service requests to the group of user devices in a communications network comprising an IP multimedia subsystem, IMS, and a capability exchange application server, wherein the group of user devices is associated with an IMS user subscription, the method comprising:
   setting the user device to be a primary user device of the group of user devices to receive all incoming service requests from services associated with the group of user devices;
   sending a primary capability indication associated with the user device to the capability exchange application server for use in notifying the primary capability indication associated with the user device to other user devices in the group of user devices, wherein the primary capability indication includes data representative of the user device being the primary user device for the group of devices so that only the primary user device receives incoming service requests from services associated with the group of user devices;
   receiving, at the primary user device, a service request associated with a first user device of the group of devices, the first user device being different from the primary user device;
   determining, at the primary user device, one or more user device(s) from the group of user devices capable of handling the received service request;
   selecting, at the primary user device, a second user device, separate from the primary user device and the first user device, from the determined user device(s) to handle the received service request; and
   redirecting, responsive to selecting the second user device, the received service request to only the second user device.

2. The method as claimed in claim 1, further comprising registering with the IMS that the user device is the primary user device for the services associated with the group of user devices.

3. The method as claimed in claim 2, further comprising:
   receiving a capabilities notification from the capabilities exchange application server, the capabilities notification comprising a primary capability indication associated with another user device of the group of user devices different to the user device; and
   if the user device is currently set as the primary user device, then in response to the capabilities notification, re-registering with the IMS to remove the user device as the primary user device for the services associated with the group of user devices.

4. The method as claimed in claim 1, further comprising:
   receiving a capabilities notification from the capabilities exchange application server, the capabilities notification comprising a primary capability indication associated with the user device; and if the user device is not currently set as the primary user device, then in response to the capabilities notification, registering with the IMS that the user device is the primary user device for the services associated with the group of user devices.

5. The method as claimed in claim 1, wherein setting the user device to be a primary user device further comprises selecting the user device from the group of user devices to be the primary user device.

6. The method as claimed in claim 1, further comprising:
receiving a capabilities exchange notification from the capability exchange application server, the capabilities exchange notification including data representative of a device identifier and one or more service capabilities associated with one or more devices in the group of devices;
storing the device identifier and the one or more service capabilities; and
identifying the services associated with the group of user devices based on one or more service capabilities.

7. The method as claimed in claim 1, further comprising identifying the services associated with the group of user devices based on IMS communication service identifiers, ICSIs, for the group of user devices.

8. The method as claimed in claim 1, wherein the user device is one of the devices in the group of user devices.

9. The method as claimed in claim 1, wherein the method is performed by the user device.

10. The method as claimed in claim 1, wherein the data representative of the user device being the primary user device for the group of devices comprises a XML capability primary tag indicating whether the user device is the primary user device.

11. The method as claimed in claim 10, wherein the XML capability primary tag further includes a privacy indication that indicates the XML capability primary tag can only be shared with user devices in the group of devices and/or trusted applications.

12. The method as claimed in claim 1, wherein setting the user device to be the primary user device of the group of user devices comprises setting the primary user device to be the only user device of the group of user devices to receive incoming service requests from services associated with the group of user devices, the incoming service requests being service requests for multimedia telephony.

13. The method as claimed in claim 1, further comprising:
identifying the services associated with the group of user devices based on IMS communication service identifiers, ICSIs, for the group of user devices;
receiving a capabilities notification from the capabilities exchange application server, the capabilities notification comprising a primary capability indication associated with another user device of the group of user devices different to the user device; and
if the user device is currently set as the primary user device, then in response to the capabilities notification, re-registering with the IMS to remove the user device as the primary user device for the services associated with the group of user devices,
wherein the data representative of the user device being the primary user device for the group of devices comprises a XML capability primary tag indicating whether the user device is the primary user device,
wherein the XML capability primary tag further includes a privacy indication that indicates the XML capability primary tag can only be shared with user devices in the group of devices and/or trusted applications, and
wherein setting the user device to be the primary user device of the group of user devices comprises setting the primary user device to be the only user device of the group of user devices to receive incoming service requests from services associated with the group of user devices, the incoming service requests being service requests for multimedia telephony.

14. An apparatus for use in routing service requests to user devices in a communications network comprising an IP multimedia subsystem, IMS, and an application server, wherein a group of user devices are associated with an IMS user subscription and the application server includes the functionality of a capabilities exchange application server, the apparatus comprising:
a receiver;
a transmitter;
a processor coupled to the receiver and the transmitter; and
a memory coupled to the processor and having instructions stored therein that are executable by the processor for causing the processor to:
receive a primary capability indication from a user device;
set the user device to be a primary user device of the group of user devices so that all incoming service requests from services associated with the group of user devices are transmitted to the primary user device and so that incoming service requests from services associated with the group of user devices are only transmitted to the primary user device;
transmit the primary capability indication associated with the user device to the capabilities exchange application server for use in notifying the primary capability indication associated with the user device to other user devices in the group of user devices, wherein the primary capability indication includes data representative of the user device being the primary user device for the group of devices;
receive a service request associated with a first user device of the group of devices, the first user device being different from the primary user device;
transmit the service request to only the user device based on the user device being the primary user device;
determine one or more user device(s) from the group of user devices capable of handling the received service request;
receive a selection, from the primary user device, of a second user device, separate from the primary user device and the first user device, from the determined user device(s) to handle the received service request; and
redirect, responsive to receiving the selection of the second user device, the received service request to only the second user device.

15. The apparatus as claimed in claim 14, wherein the instructions are further executable for causing the processor to register with the IMS that the user device is the primary user device for the services associated with the group of user devices.

16. The apparatus as claimed in claim 15, wherein the instructions are further executable for causing the processor to:
receive a capabilities notification from the application server, the capabilities notification comprising a primary capability indication associated with another user device of the group of user devices different to the user device; and if the user device is currently set as the primary user device, then in response to the capabilities notification, re register with the IMS to remove the user device as the primary user device for the services associated with the group of user devices.

17. The apparatus as claimed in claim 14, wherein the instructions are further executable for causing the processor to:

receive a capabilities notification from the capabilities exchange application server, the capabilities notification comprising a primary capability indication associated with the user device; and if the user device is not currently set as the primary user device, then in response to the capabilities notification, register with the IMS that the user device is the primary user device for the services associated with the group of user devices.

18. The apparatus as claimed in claim 14, wherein the instructions are further executable for causing the processor to only select the user device from the group of user devices to be the primary user device.

19. The apparatus as claimed in claim 14, wherein the apparatus is implemented in at least one user device of the group of user devices.

20. The apparatus as claimed in claim 14, the instruction further causing the processor to transmit, prior to receiving the selection, a list of the one or more user device(s) from the group of user devices capable of handling the service request to the primary user device for the group of devices based on the primary capability indication.

21. A computer program product comprising a non-transitory computer readable storage medium storing code which, when run from a computer readable memory in a processor in an apparatus, causes the apparatus to:

receive a primary capability indication from a user device;

set the user device to be a primary user device of the group of user devices so that all incoming service requests from services associated with the group of user devices are transmitted to the primary user device and so that incoming service requests from services associated with the group of user devices are only transmitted to the primary user device;

transmit the primary capability indication associated with the user device to a capability exchange application server for use in notifying the primary capability indication associated with the user device to other user devices in the group of user devices, wherein the primary capability indication includes data representative of the user device being the primary user device for the group of devices;

receive a service request associated with a first user device of the group of devices, the first user device being different from the primary user device;

transmit the service request to the user device based on the user device being the primary user device;

determine one or more user device(s) from the group of user devices capable of handling the received service request;

receive a selection, from the primary user device, of a second user device, separate from the primary user device and the first user device, from the determined user device(s) to handle the received service request; and redirect, responsive to receiving the selection of the second user device, the received service request to only the second user device.

* * * * *